(12) United States Patent
DiMaria et al.

(10) Patent No.: US 7,908,273 B2
(45) Date of Patent: Mar. 15, 2011

(54) METHOD AND SYSTEM FOR MEDIA NAVIGATION

(75) Inventors: Peter C. DiMaria, Berkeley, CA (US); Markus K. Cremer, Berkeley, CA (US); Vadim Brenner, San Francisco, CA (US); Dale T. Roberts, San Anselmo, CA (US)

(73) Assignee: Gracenote, Inc., Emeryville, CA (US)

( * ) Notice: Subject to any disclaimer, the term of this patent is extended or adjusted under 35 U.S.C. 154(b) by 462 days.

(21) Appl. No.: 11/716,269

(22) Filed: Mar. 9, 2007

(65) Prior Publication Data
US 2007/0288478 A1  Dec. 13, 2007

Related U.S. Application Data

(60) Provisional application No. 60/781,609, filed on Mar. 9, 2006.

(51) Int. Cl.
*G06F 7/00* (2006.01)
(52) U.S. Cl. .................... 707/736; 707/E17.009
(58) Field of Classification Search .............. 707/1–102, 707/999.01, 736, E17.009
See application file for complete search history.

(56) References Cited

U.S. PATENT DOCUMENTS

| | | | |
|---|---|---|---|
| 4,488,179 A | 12/1984 | Kruger et al. |
| 4,870,568 A | 9/1989 | Kahle et al. |
| 5,019,899 A | 5/1991 | Boles et al. |
| 5,132,949 A | 7/1992 | Choi |
| 5,157,614 A | 10/1992 | Kashiwazaki et al. |
| 5,206,949 A | 4/1993 | Cochran et al. |
| 5,237,157 A | 8/1993 | Kaplan |
| 5,337,347 A | 8/1994 | Halstead-Nussloch et al. |
| 5,341,350 A | 8/1994 | Frank et al. |
| 5,388,259 A | 2/1995 | Fleischman et al. |
| 5,392,264 A | 2/1995 | Hira |
| 5,410,543 A | 4/1995 | Seitz et al. |
| 5,446,714 A | 8/1995 | Yoshio et al. |
| 5,446,891 A | 8/1995 | Kaplan et al. |
| 5,464,946 A | 11/1995 | Lewis |
| 5,475,835 A | 12/1995 | Hickey |
| 5,483,598 A | 1/1996 | Kaufman et al. |

(Continued)

FOREIGN PATENT DOCUMENTS

DE 4427046 C2 2/2001

(Continued)

OTHER PUBLICATIONS

"U.S. Appl. No. 10/548,702, Response filed Jan. 25, 2008 to Final Office Action mailed Oct. 5, 2008", 17 pgs.

(Continued)

*Primary Examiner* — Tim T. Vo
*Assistant Examiner* — Shiow-Jy Fan
(74) *Attorney, Agent, or Firm* — Schwegman, Lundberg & Woessner, P.A.

(57) ABSTRACT

A method and system for media navigation. A descriptor hierarchy may be accessed. The descriptor hierarchy may include at least one category list. One or more media descriptors may be accessed for a plurality of media items. The plurality of media items may be accessible from a plurality of sources. The one or more media descriptors may be mapped to the at least one category list. The navigation may be processed through a user interface to enable selection of the plurality of media items from the plurality of sources.

28 Claims, 26 Drawing Sheets

U.S. PATENT DOCUMENTS

| | | |
|---|---|---|
| 5,488,725 A | 1/1996 | Turtle et al. |
| 5,583,560 A | 12/1996 | Florin et al. |
| 5,615,345 A | 3/1997 | Wanger |
| 5,616,876 A | 4/1997 | Cluts |
| 5,625,608 A | 4/1997 | Grewe et al. |
| 5,642,337 A | 6/1997 | Oskay et al. |
| 5,659,732 A | 8/1997 | Kirsch |
| 5,673,322 A | 9/1997 | Pepe et al. |
| 5,679,911 A | 10/1997 | Moriyama et al. |
| 5,689,484 A | 11/1997 | Hirasawa |
| 5,691,964 A | 11/1997 | Niederlein et al. |
| 5,694,162 A | 12/1997 | Freeny, Jr. |
| 5,721,827 A | 2/1998 | Logan et al. |
| 5,727,129 A | 3/1998 | Barrett et al. |
| 5,740,304 A | 4/1998 | Katsuyama et al. |
| 5,740,549 A | 4/1998 | Reilly et al. |
| 5,751,672 A | 5/1998 | Yankowski |
| 5,751,956 A | 5/1998 | Kirsch |
| 5,757,739 A | 5/1998 | Heath et al. |
| 5,761,606 A | 6/1998 | Wolzien et al. |
| 5,768,222 A | 6/1998 | Hisamatsu et al. |
| 5,774,666 A | 6/1998 | Portuesi |
| 5,781,889 A | 7/1998 | Martin et al. |
| 5,781,897 A | 7/1998 | Chen et al. |
| 5,781,909 A | 7/1998 | Logan et al. |
| 5,796,393 A | 8/1998 | MacNaughton et al. |
| 5,809,512 A | 9/1998 | Kato |
| 5,815,471 A | 9/1998 | Mince et al. |
| 5,822,216 A | 10/1998 | Satchell, Jr. et al. |
| 5,835,914 A | 11/1998 | Brim |
| 5,838,910 A | 11/1998 | Domenikos et al. |
| 5,848,427 A | 12/1998 | Hyodo |
| 5,862,223 A | 1/1999 | Walker et al. |
| 5,894,554 A | 4/1999 | Lowery et al. |
| 5,903,816 A | 5/1999 | Broadwin et al. |
| 5,918,223 A | 6/1999 | Blum et al. |
| 5,929,857 A | 7/1999 | Dinallo et al. |
| 5,959,945 A | 9/1999 | Kleiman |
| 5,987,454 A | 11/1999 | Hobbs |
| 6,005,565 A | 12/1999 | Legall et al. |
| 6,025,837 A | 2/2000 | Matthews, III et al. |
| 6,104,334 A | 8/2000 | Allport |
| 6,112,240 A | 8/2000 | Pogue et al. |
| 6,128,255 A | 10/2000 | Yankowski |
| 6,131,129 A | 10/2000 | Ludtke et al. |
| 6,138,162 A | 10/2000 | Pistriotto et al. |
| 6,138,175 A | 10/2000 | de Carmo |
| 6,175,857 B1 | 1/2001 | Hichaya et al. |
| 6,189,030 B1 | 2/2001 | Dirsch et al. |
| 6,201,176 B1 | 3/2001 | Yourlo |
| 6,226,672 B1 | 5/2001 | DeMartin et al. |
| 6,230,192 B1 | 5/2001 | Roberts et al. |
| 6,243,328 B1 | 6/2001 | Fenner et al. |
| 6,243,725 B1 | 6/2001 | Hempleman et al. |
| 6,247,022 B1 | 6/2001 | Yankowski |
| 6,260,059 B1 | 7/2001 | Ueno et al. |
| 6,272,078 B2 | 8/2001 | Yankowski |
| 6,304,523 B1 | 10/2001 | Jones et al. |
| 6,314,570 B1 | 11/2001 | Tanigawa et al. |
| 6,327,233 B1 | 12/2001 | Downs et al. |
| 6,388,957 B2 | 5/2002 | Yankowski |
| 6,388,958 B1 | 5/2002 | Yankowski |
| 6,434,597 B1 | 8/2002 | Hachiya et al. |
| 6,505,160 B1 | 1/2003 | Levy et al. |
| 6,535,869 B1 | 3/2003 | Housel, III |
| 6,535,907 B1 | 3/2003 | Hachiya et al. |
| 6,609,105 B2 | 8/2003 | Van Zoest et al. |
| 6,631,523 B1 | 10/2003 | Matthews, III et al. |
| 6,636,249 B1 | 10/2003 | Rekimoto |
| 6,654,735 B1 | 11/2003 | Eichstaedt et al. |
| 6,775,374 B2 | 8/2004 | Nishikawa |
| 6,829,368 B2 | 12/2004 | Meyer et al. |
| 6,941,275 B1 | 9/2005 | Swierczek |
| 6,941,325 B1 | 9/2005 | Benitez et al. |
| 6,983,289 B2 | 1/2006 | Commons et al. |
| 7,181,543 B2 | 2/2007 | King et al. |
| 7,302,574 B2 | 11/2007 | Conwell et al. |
| 7,349,552 B2 | 3/2008 | Levy et al. |
| 7,415,129 B2 | 8/2008 | Rhoads |
| 7,461,136 B2 | 12/2008 | Rhoads |
| 7,587,602 B2 | 9/2009 | Rhoads |
| 7,590,259 B2 | 9/2009 | Levy et al. |
| 2001/0052028 A1 | 12/2001 | Roberts |
| 2002/0033844 A1 | 3/2002 | Levy et al. |
| 2002/0178410 A1 | 11/2002 | Haitsma et al. |
| 2003/0009340 A1 | 1/2003 | Hayashi et al. |
| 2003/0023852 A1 | 1/2003 | Wold |
| 2003/0031260 A1 | 2/2003 | Tabatabai et al. |
| 2003/0033321 A1 | 2/2003 | Schrempp et al. |
| 2003/0037010 A1 | 2/2003 | Schmelzer |
| 2003/0046283 A1 | 3/2003 | Roberts |
| 2003/0086341 A1 | 5/2003 | Wells et al. |
| 2003/0135488 A1 | 7/2003 | Amir et al. |
| 2003/0195863 A1* | 10/2003 | Marsh .............................. 707/1 |
| 2004/0099126 A1 | 5/2004 | Kawashima |
| 2004/0102973 A1 | 5/2004 | Lott |
| 2004/0194611 A1 | 10/2004 | Kawana et al. |
| 2005/0154588 A1 | 7/2005 | Janas, III et al. |
| 2006/0026162 A1* | 2/2006 | Salmonsen et al. ............. 707/10 |
| 2006/0167903 A1* | 7/2006 | Smith et al. .................... 707/100 |
| 2007/0106405 A1 | 5/2007 | Cook et al. |
| 2009/0076821 A1 | 3/2009 | Brenner et al. |
| 2010/0005104 A1 | 1/2010 | DiMaria et al. |

FOREIGN PATENT DOCUMENTS

| | | |
|---|---|---|
| EP | 0367585 A2 | 5/1990 |
| EP | 0936531 A2 | 8/1999 |
| EP | 0961209 A1 | 12/1999 |
| EP | 1193616 A1 | 4/2002 |
| EP | 1197020 B1 | 11/2007 |
| JP | 10171818 | 6/1998 |
| JP | 10233081 A2 | 9/1998 |
| JP | 2000174797 A2 | 6/2000 |
| WO | WO-9120082 | 12/1991 |
| WO | WO-9705616 A1 | 2/1997 |
| WO | WO-9721291 | 6/1997 |
| WO | WO-9741504 | 11/1997 |
| WO | WO-9800788 | 1/1998 |
| WO | WO-9802820 | 1/1998 |
| WO | WO-01/20609 | 3/2001 |
| WO | WO-0211123 A3 | 2/2002 |
| WO | WO-03012695 A2 | 2/2003 |
| WO | WO-2007022533 A2 | 2/2007 |
| WO | WO-2007022533 A3 | 2/2007 |
| WO | WO-2007103583 A2 | 9/2007 |
| WO | WO-2007103583 A3 | 9/2007 |

OTHER PUBLICATIONS

"U.S. Appl. No. 10/548,702, Response filed Dec. 18, 2007 to Final Office Action mailed Oct. 5, 2007", 16 pgs.

"U.S. Appl. No. 10/548,702, Non-Final Office Action mailed Apr. 29, 2008", 25 Pgs.

"U.S. Appl. No. 10/913,248, Non-Final Office Action mailed Feb. 21, 2008", 17 pgs.

"U.S. Appl. No. 10/913,248, Response filed Nov. 27, 2007 to Final Office Action mailed Sep. 18, 2007", 14 pgs.

"U.S. Appl. No. 10/913,248, Final Office Action mailed Sep. 18, 2007", 14 pgs.

"International Application Serial No. PCT/US06/32722, Written Opinion mailed Apr. 25, 2007", 5 pgs.

"International Application Serial No. PCT/US06/32772, International Search Report mailed Apr. 25, 2007", 5 pgs.

"International Application Serial No. PCT/US07/06131, International Search Report mailed Mar. 10, 2008", 4 pgs.

"International Application Serial No. PCT/US07/06131, Written Opinion mailed Mar. 10, 2008", 6 pgs.

"U.S. Appl. No. 10/548,702, Advisory Action mailed Jan. 15, 2008", 3 pgs.

"U.S. Appl. No. 10/548,702, Preliminary Amendment mailed Sep. 8, 2005", 5 pgs.

"U.S. Appl. No. 10/917,686, Response filed Mar. 2, 2009 to Non-Final Office Action mailed Nov. 6, 2008", 8 pgs.

"U.S. Appl. No. 10/917,686, Non-Final Office Action mailed Oct. 14, 2008", 24 pgs.

"U.S. Appl. No. 10/917,686, Non-Final Office Action Mailed on Nov. 6, 2008", 12 Pgs.

"European Application No. 06802049.4, Extended European Search Report Mailed Sep. 5, 2008", 6 pgs.

Bird, S., et al., "A formal framework for linguistic annotation", Linguistic Data Consortium, University of Pennsylvania 3615 market street Philadelphia, PA 19104-2608, (Aug. 2, 2000), 38 pgs.

Clements, M, et al., "Phonetic Searching of Digital Audio", First Talk Communications, inc Atlanta, Georgia, (Aug. 4, 2002), 1-10.

*Philips Ambilight TV News Release*, http://www.techdiaest.tv/2006/01/ces_2006_philip_3.html, CES, (2006),2 pgs.

*USMARC Format for Bibliographic Data, Including Guidelines for Content Designation*, Prepared by Network Development & MARC Standards Office, Cataloging Distribution Service, Library of Congress,(1994),547 pgs.

*USMARC Format for Bibliographic Data, Update #2*, Prepared by Network Development & MARC Standards Office, Cataloging Distribution Service, Library of Congress,(Mar. 1996),484 pgs.

*Information Retrieval (Z39.50): Application Service Definition and Protocol Specification*, ANSI/NISO Z39.50 1995,(Jul. 1995),163 pgs.

*Proposal No. 95-1—Changes to Field 856 (Electronic Location and Access) in the USMARC Bibliographic Format*, http://www.loc.gov/marc/marbi/1995/95-01.html, Source: Library of Congress; Federal Geographic Data Committee,(Dec. 2, 1994),13 sheets.

*Proposal No. 95-8—Define Field 856 (Electronic Location and Access) in the USMARC Classification Format*, http://www.loc.gov/marc/marbi/1995/95-08.html, Source: Library of Congress,(May 5, 1995), 1-2.

*Bookwhere for Windows v.1.1—README*, Sea Change Corporation,(1995),2 pgs.

*GeoPac Management Guide, Release 1.25*, Geac Computer Corporation Limited,(Dec. 1994),50 pgs.

*BookWhere for Windows*, Help Topics for BookWhere,(1996),16 pgs.

*BookWhere for Windows v. 2.1—README*, Sea Change Corporation,(1996),7 pgs.

*BookWhere for Windows User Guide*, SoftwareVersion 2.0—Manual Version 2.0.4, Sea Change Corporation,(Sep. 11, 1996),1-36.

"U.S. Appl. No. 09/933,845 Final Office Action mailed May 19, 2005", 10 pgs.

"U.S. Appl. No. 09/933,845 Final Office Action mailed Jul. 3, 2007", 15 pgs.

"U.S. Appl. No. 09/933,845 Final Office Action mailed Jul. 5, 2006", 14 pgs.

"U.S. Appl. No. 09/933,845 Non Final Office Action mailed Jan. 3, 2006", 9 pgs.

"U.S. Appl. No. 09/933,845 Non Final Office Action mailed Oct. 27, 2004", 7 pgs.

"U.S. Appl. No. 09/933,845 Non Final Office Action mailed Nov. 30, 2006", 15 pgs.

"U.S. Appl. No. 09/933,845 Response filed Jan. 27, 2005 to Non Final Office Action mailed Nov. 27, 2004", 8 pgs.

"U.S. Appl. No. 09/933,845 Response filed Mar. 28, 2006 to non-final office action mailed Jan. 3, 2006", 9 pgs.

"U.S. Appl. No. 09/933,845 Response filed Mar. 30, 2007 to Non Final Office Action mailed Nov. 30, 2006", 8 pgs.

"U.S. Appl. No. 10/073,772 Advisory Action mailed Jul. 28, 2006", 3 pgs.

"U.S. Appl. No. 10/073,772 Final Office Action mailed Apr. 6, 2006", 21 pgs.

"U.S. Appl. No. 10/073,772 Non Final Office Action mailed Sep. 19, 2005", 13 pgs.

"U.S. Appl. No. 10/073,772 Notice of Allowance mailed Feb. 28, 2007", 6 pgs.

"U.S. Appl. No. 10/073,772 Notice of Allowance mailed Aug. 9, 2007", NOAR,10 pgs.

"U.S. Appl. No. 10/073,772 Notice of Allowance mailed Sep. 6, 2006", 5 pgs.

"U.S. Appl. No. 10/073,772 Response filed Mar. 17, 2006 to Non Final Office Action mailed Sep. 19, 2005", 12 pgs.

"U.S. Appl. No. 10/073,772 Response filed Jul. 6, 2006 to Final Office Action mailed Apr. 6, 2006", 8 pgs.

"U.S. Appl. No. 10/073,772 Response filed Aug. 7, 2006 to Advisory Action mailed Jul. 28, 2006", 3 pgs.

"U.S. Appl. No. 10/533,211 Non Final Office Action mailed Nov. 14, 2006", 9 pgs.

"U.S. Appl. No. 10/533,211 Non Final Office Action mailed Jun. 12, 2007", 8 pgs.

"U.S. Appl. No. 10/533,211 Response filed Mar. 14, 2007 to non-final office action mailed Nov. 14, 2006", 8 pgs.

"U.S. Appl. No. 10/548,702 Response filed Aug. 29, 2007 to Non-Final Office Action mailed Jun. 21, 2007", 64 pgs.

"U.S. Appl. No. 10/548,702 Non-Final Office Action mailed Jun. 21, 2007", 18 pgs.

"U.S. Appl. No. 10/548,702, Final Office Action Mailed Oct. 5, 2007", FOAR, 26 Pages.

"U.S. Appl. No. 10/533,211, Response filed Oct. 1, 2007 to Non-Final Office Action mailed Jun. 12, 2007", 12 pgs.

"CD Red Book Standard", *IEC 60908 Ed. 2.0*, Sony/Philips,(1999),1-209 pgs.

"CEDIA, Electronic Lifestyles Awards for Manufactures Excellence", Entry for Best Video Product, Power Play, , (Sep. 1999),pp. 1-4.

"Proposal No. 97-9", *Renaming of subfield 856$u to accommodate URNs*, (May 1, 1997).

"Sirius Satellite Radio", http://www.sirius.com, (Accessed Apr. 18, 2006),1 pg.

"Specification of the radio data system (RDS)", *IEC standard 62106:2000*; http://webstore.iec.ch/preview/info_iec62106{ed1.0}en.pdf, (2000),6 pgs.

"The Ultimate DVD Source", *Powerplay*, (Sep. 1999),2 pgs.

"XM Radio", http://www.xm-radio.com/, (Accessed Apr. 18, 2006),1 pg.

Akscyn, Robert M., et al., "Design of hypermedia script languages: the KMS experience", *Proceedings of the Fifth ACM Conference on Hypertext*, (1993),268-269.

Allamanche, E , "Content-Based Identification of Audio Material Using MPEG-7 Low Level Description", *Proceedings of the International Symposium of Music Information Retrieval*, (2001),8 pgs.

Baugher, Mark , et al., "A multimedia client to the IBM LAN server", *Proceedings of the first ACM International Conference on Multimedia*, (1993),105-112.

Beadle, H P., et al., "Location aware mobile computing", *Proceedings of the IEEE/IEE International Conference on Telecommunications*, (1997),1319-1324.

Berners-Lee, T., et al., *Hypertext Transfer Protocol—HTTP 1.0*, Network Working Group,(May 1996),61 pgs.

Cano, P , et al., "A review of algorithms for audio fingerprinting", *Proceedings of 2002 IEEE Workshop on Multimedia Signal Processing*, Virgin Islands, USA, (2002),5 pgs.

Cano, Pedro, et al., "Robust Sound Modeling for Song Detection in Broadcast Audio", *Audio Engineering Society, 112th Convention*, Munich, Germany, (May 2002),1-7.

Chua, T. S., et al., "Content-based retrieval of segmented images", *Proceedings of the Second ACM International Conference on Multimedia*, (1994),211-218.

Comer, Douglas E., et al., *Interworking with TCP/IP*, vol. 3, *Client-server programming and applications*, BSD Socket Version, Upper Saddle River, NJ: Prentice Hall,(1993),1-498.

Comer, Douglas E., et al., *Internetworking with TCP/IP*, vol. 2, *Design, implementation, and internals*, ANSI C Version, 3rd Edition, Upper Saddle River, NJ: Prentice Hall,(1999),1-660.

Comer, Douglas, et al., "Chapter 4—Internet Addresses & Chapter 5—Mapping Internet Addresses to Physical Addresses (ARP)", *Internetworking with TCP/IP*, vol. 1, Upper Saddle River, N.J. : Prentice Hall,(1995),59-88, 588.

De Roure, David , et al., "A Multiagent system for Content Based Navigation of Music", *Proc. ACM Multimedia*, 99 (Part 2), (1999),63-66.

Hirata, K., et al., "Media-based navigation for hypermedia systems", *Proceedings of the Fifth ACM Conference on Hypertext*, (1993),159-173.

Lewis, P. H., et al., "Content based navigation in multimedia information systems", *Proceedings of the Fourth ACM International Conference on Multimedia*, (1997),415-416.

Lewis, Paul H., et al., "Media-based Navigation with Generic Links", *Proceedings of the the Seventh ACM Conference on Hypertext*, (1996),215-223.

Little, T. D., et al., "A digital on-demand video service supporting content-based queries", *Proceedings of the First ACM International Conference on Multimedia*, (1993),427-436.

Martin, Keith D., et al., "Music Content Analysis through Models of Audition", (1998),8 pgs.

McNab, Rodger J., et al., "Towards the digital music library: tune retrieval from acoustic input", *Proceedings of the First ACM International Conference on Digital Libraries*, (1996),11-18.

Nilsson, M., "ID3 tag version 2.3.0", http://www.id3.org/id3v2.3.0.txt, (Feb. 3, 1999).

Oikarinen, J., et al., "Internet Relay Chat Protocol", *RFC 1459, Network Working Group*, (May 1993).

Pfitzinger, H R., "The collection of spoken language resources in car environments", *ICLRE*, vol. 2, (1998),1097-1100.

Plenge, G., "DAB—A new radio broadcasting system—State of development and ways for its introduction", *Rundfunktechnische Mitteilungen*, 35(2), (1991),45-66.

Roscheisen, M., et al., "Beyond browsing: shared comments, SOAPs, trails, and on-line communities", *Computer Networks and ISDN Systems*, 27(6), (Apr. 1995),739-749.

Rowan, Clem W., et al., "When car radios were illegal: A history of early American and European car radios", *Society of Automotive Engineers Technical Paper Series*, (1985),1-20.

Samson, et al., "Search times using hash tables for records with non-unique keys,", *The Computer Journal*, (Dec. 1976),210-214.

Seltzer, Richard, "The AltaVista Search Revolution", *Osbourne McGraw-Hill*, (1997),7, 8; 215-37.

Shibata, Y., et al., "Dynamic hypertext and knowledge agent systems for multimedia information networks", *Proceedings of the Fifth ACM Conference on Hypertext*, (1993),82-93.

Thimbleby, H., et al., "Ethics and Consumer Electronics", *Proceedings of the 4th ETHICOMP International Conference on the Social and Ethical Impacts of Information and Communication Technologies*, (1999),9 pgs.

Tibbetts, Margery, *Sep. 1995 ZIG Meeting Minutes*, ftp://lcweb.loc.gov/pub/z3950/minutes/9509.txt,(Sep. 25, 1995),22 pgs.

Tompa, F. W., et al., "Hypertext by link-resolving components", *Proceedings of the Fifth ACM Conference on Hypertext*, (1993),118-130.

Troll, Denise, *Z39.50 Implementors Group Meeting Minutes*, ftp://lcweb.loc.gov/pub/z3950/minutes/9504.txt,(Apr. 25, 1995),29 pgs.

Wold, E., "Content-based classification, search,. and retrieval of audio", *IEEE Multimedia*, 3(3), (Fall 1996),27-36.

Zhang, Hongjiang, et al., "Video Parsing, Retrieval and Browsing: An Integrated and Content-Based Solution", *ACM Multimedia 95—Electronic Proceedings*, San Francisco, California,(Nov. 5-9, 1995),19 pgs.

"U.S. Appl. No. 10/548,702, Response filed Jul. 8, 2008 to Non Final Office Action mailed Apr. 29, 2008", 14 pgs.

"U.S. Appl. No. 10/548,702, Final Office Action mailed Sep. 16, 2008", 23 pgs.

"U.S. Appl. No. 10/002,627, 312 Amendment filed Feb. 18, 2005", 8 pgs.

"U.S. Appl. No. 10/002,627, Notice of Allowance mailed Dec. 23, 2004", 3 pgs.

"U.S. Appl. No. 10/002,627, Preliminary Amendment filed Feb. 15, 2002", 2 pgs.

"U.S. Appl. No. 10/913,248, Non Final Office Action mailed Jan. 24, 2007", 20 pgs.

"U.S. Appl. No. 10/913,248, Response filed Jun. 25, 2007 to Non Final Office Action mailed Jan. 24, 2007", 11 pgs.

"U.S. Appl. No. 10/917,686, Final Office Action mailed May 14, 2009", 10 pgs.

"U.S. Appl. No. 10/917,686, Non-Final Office Action mailed Sep. 9, 2009", 10 Pgs.

"U.S. Appl. No. 10/917,686, Response filed Jul. 17, 2009 to Final Office Action mailed May 14, 2009", 7 pgs.

04716679.8, "European application No. 04716679.8 office action mailed Jul. 14, 2009", 4.

"U.S. Appl. No. 10/917,686, Examiner Interview Summary mailed Jun. 29, 2009", 2 pgs.

"U.S. Appl. No. 10/917,686, Response filed Dec. 9, 2009 to Non Final Office Action mailed Sep. 9, 2009", 7 pgs.

Wells, Maxwell J, et al., "Music Search Methods Based on Human Perception", U.S. Appl. No. 09/556,086, filed Apr. 21, 2000, 50 pgs.

"U.S. Appl. No. 10/917,686, Final Office Action mailed Mar. 16, 2010", 16.

"U.S. Appl. No. 10/913,248, Preliminary Amendment filed Aug. 5, 2004", 4 pgs.

"U.S. Appl. No. 10/917,686, Decision on Pre-Appeal Brief Request mailed Jul. 18, 2010", 2 pgs.

"U.S. Appl. No. 10/917,686, Examiner Interview Summary mailed Mar. 10, 2010", 3 pgs.

"U.S. Appl. No. 10/917,686, Notice of Allowance mailed Aug. 10, 2010", 6 pgs.

"U.S. Appl. No. 10/917,686, Pre-Appeal Brief Request filed Jun. 16, 2010", 5 pgs.

"U.S. Appl. No. 11/884,322, Non-Final Office Action mailed Sep. 3, 2010", 11 pgs.

"U.S. Appl. No. 11/884,322, Preliminary Amendment filed Aug. 14, 2007", 3 pgs.

"U.S. Appl. No. 11/884,322, Supp. Preliminary Amendment filed Mar. 31, 2009", 11 pgs.

"European Application Serial No. 01984953.8, Summons to Attend Oral Proceedings mailed Jun. 30, 2010", 6 pgs.

"European Application Serial No. 06802049.4, Summons to Attend Oral Proceedings mailed Aug. 12, 2010", 6 Pgs.

"European Application Serial No. 07752807.3, Extended European Search Report mailed Aug. 3, 2010", 9 pgs.

Pachet, F, et al., "A combinatorial approach to content-based music selection", Proceedings of the International Conference on Multimedia Computing and Systems vol. 1, XP002165216, (Jun. 7, 1999), 457-462.

Pachet, F, et al., "A combinatorial approach to content-based music selection", IEEE Multimedia Computing and Systems vol. 7, No. 1, XP002165217, (Jan. 1, 2000), 44-51.

* cited by examiner

METHOD AND SYSTEM FOR MEDIA NAVIGATION

CROSS-REFERENCE TO A RELATED APPLICATION

This application claims the benefit of U.S. Provisional Patent Application entitled "Method and System to Navigate Media from Multiple Sources", Ser. No. 60/781,609, Filed 9 Mar. 2006, the entire contents of which is herein incorporated by reference.

FIELD

This application relates to media navigation, and more specifically to systems and methods for navigating media from a plurality of sources.

BACKGROUND

The growth in popularity of digital media has brought increased benefits and accompanying new challenges. While developments have continued to improve the digitization, compression, and distribution of digital media, it has become difficult to easily and effectively navigating through such media. Accessing media from a variety of sources of potentially different types for navigation increases the difficultly of navigation, as each of the sources may include a large number of media items including songs, videos, pictures, and/or text in a variety of formats and with varying attributes.

The sheer volume of digital media available, along with significant diversity in metadata systems, navigational structures, and localized approaches, makes it difficult for any single device or application user interface to meet the needs of all users for accessing the digital media.

In general, descriptive metadata ordinarily associated with the digital media may be unavailable, inaccurate, incomplete and/or internally inconsistent. When available, the metadata is often only available via textual tags that indicate only a single level of description (e.g., rock genre), and the level of granularity used in that single level may vary greatly even within a single defined vocabulary for the metadata. Often the level of granularity available is either too detailed or too coarse to meet the needs of a given user interface requirement. Additionally, for a given media object there may be multiple values available for a given descriptor type, and/or multiple values of the same type from multiple sources that may cause additional problems when attempting to navigate the digital media.

While the scope and diversity of digital media available to users has increased, the user interface constraints of limited screen size and resolution in some devices have remained effectively fixed. Although increases in resolution have been gained, the screen size being used to access some digital media has decreased as the devices have become more portable. Portable devices may include constraints that the length of lists and the length of the terms used in such lists remain short and simple.

At the same time, the application logic driving media applications such as automatic playlist engines, recommendation engines, user profiling and personalization functions, and community services benefits from increasingly detailed and granular descriptive data. Systems that attempt to utilize the same set of descriptors for both user interface display and application logic may be unable to meet both needs effectively at once, while using two completely separate systems risk discontinuity and user confusion.

In addition, different users may use different media navigation structures, labeling and related content when accessing content from different geographic regions, in different languages, from various types of devices and applications, from different user types, and/or according to personal media preferences. Existing navigation structures may not enable developers to easily select, configure and deliver appropriate navigational elements to each user group or individual user, especially in the case of an embedded device.

Traditionally, access to media available from such alternatives has been organized in a source or service paradigm. If a user desired to hear jazz music, they would either pre-select just a single device or source to browse, such as a local HDD, or drill in and out of the navigation UI for each device/source separately to view available jazz content.

Existing media navigation solutions have been more or less static in terms of not being able to respond dynamically to changes in a user's media collection or other explicit or implicit, temporary or long-term personal preferences. Likewise, there has been only limited capability for media navigation options to respond dynamically to real-time or periodic changes in other global and personal contextual data sources including those related to time, location, motion, orientation, personal presence, object presence.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1A:
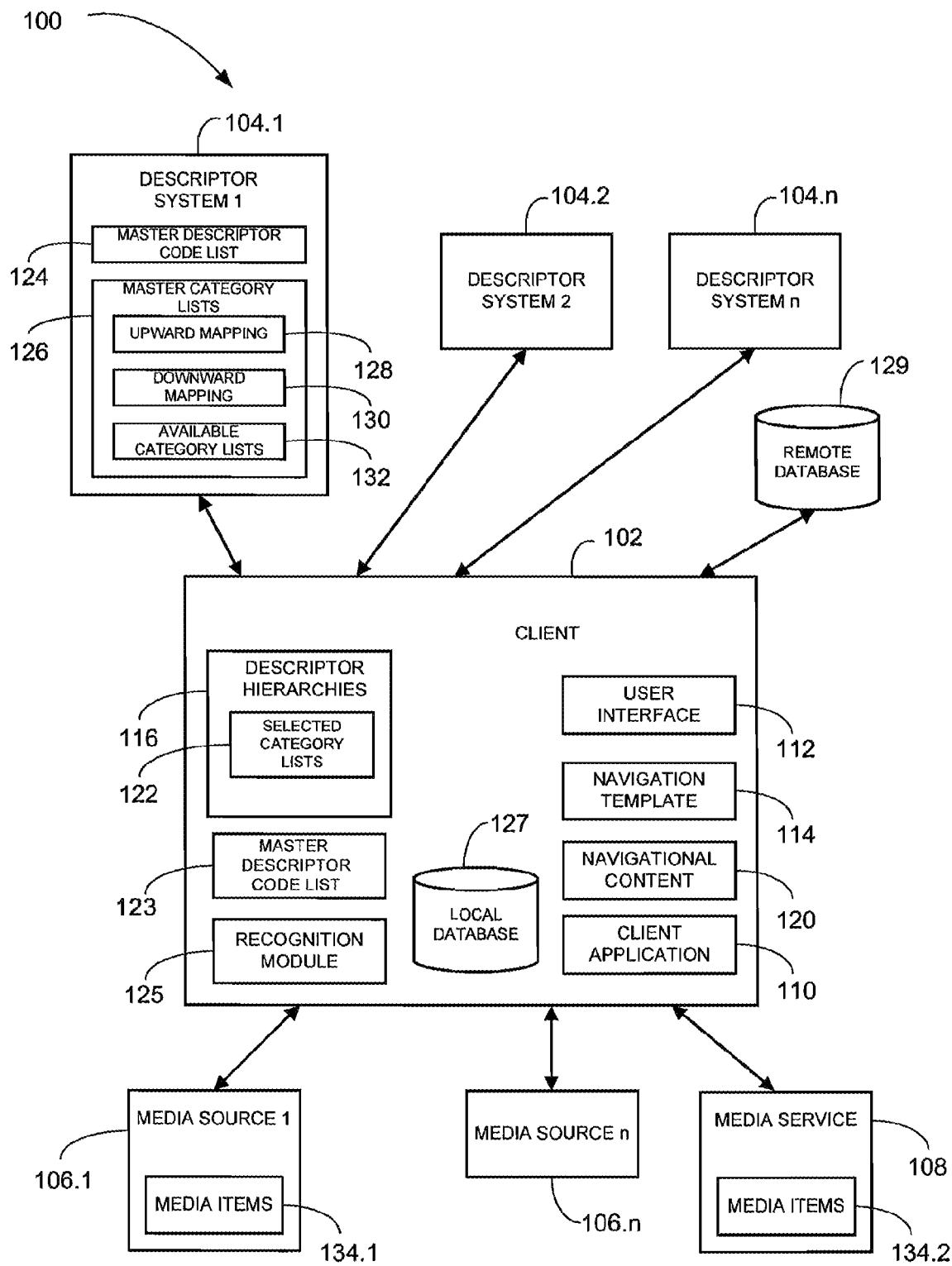
FIGS. 1A & 1B are block diagrams of example navigation systems.

Example methods and systems for media navigation are described. In the following description, for purposes of explanation, numerous specific details are set forth in order to provide a thorough understanding of example embodiments. It will be evident, however, to one skilled in the art that the present invention may be practiced without these specific details.

A navigation system is described that may provide consistent, simple, effective, and efficient access to a vast scope of digital media, regardless of application, display device or user interface (UI) paradigm. The navigation system may be deployed to enable end-users to perform customization and re-classification of their media collections without impacting the integrity of an underlying portion of the navigation system. Example embodiments of the navigation system may be used to navigate digital content (e.g., digital audio) and may thus be deployed in a portable media device (e.g., MP3 player, iPOD, or audio any other portable audio player), in vehicle audio systems, home stereo systems, computers or the like.

The navigation system may enable the efficient configuration and dynamic updating of diverse navigational structures across a plurality of devices and applications, while maintaining the integrity of the underlying metadata. A configuration module of the navigation system may automatically pre-generate and load into a client (e.g., provided on a media player) appropriate alternative normalized media navigation structures. The structures may be used to create an indexed application media database and navigational elements to present one or more views of media items of diverse and multiple sources, types and metadata. The views may be switched on demand, personalized, dynamically adapted and updated without altering the underlying global granular source media identifiers, descriptor codes and/or labeling data.

An example system may be built upon a foundation of navigation structures that may include lists, ordering data, hierarchies, trees, weighted relations, mappings, links, and other information architecture elements, as well as entity grouping, labeling, filters and related navigational content. The navigation structures may incorporate a set of semantic entities and descriptors designed to be understandable and appropriate and may be automatically optimized. Thus, for example, a user of a media device (e.g., a portable media player or vehicle audio system) may be customized or optimized for one or more particular users or user location(s).

The navigation system may include a mapping of global internal granular annotation codes to a variety of alternative category lists and navigational content used for user interface purposes. The category lists may be fluidly mixed and matched to generate a wide variety of hierarchies and navigation trees while maintaining the integrity of the parent-child mapping between each list and without any change in the global granular annotation codes.

In a pre-processing phase, a configuration module may be utilized to automatically select from a pre-defined super-set of options, pre-generate and load into a specific connected or unconnected client at time of manufacture or initial start-up an appropriate set of alternative normalized media navigation structures. The options chosen may be determined based on a combination of device, application, region, language, user type, manufacturer/publisher, and/or end-user account IDs which are provided as parameters to the configuration module.

A client application may then utilize the navigational structures to create an indexed application media database, typically in conjunction with media recognition technology.

The index may compile media items sourced from diverse and multiple types, services and providers. Additionally, the media items may be accessed from diverse and multiple devices, connectivity and transport. The media items may furthermore contain identifiers and metadata of diverse types, completeness, consistency and accuracy without materially impacting the performance of the system.

The client application may utilize the navigational structures to generate default and alternative user interface elements such as browse trees, faceted navigation, and relational lists, and/or to drive aspects of application logic such as auto-playlisting, search, personalization, recommendation, internet community, media retail and on-demand subscription services, and the like.

In an example embodiment, the user interface elements present, uniquely for each user on a client, simple, unified (descriptor-based and other) views. Via an application programming interface (API) provided on the media player, the views and structures may be altered on demand, personalized, dynamically adapted (based on personalized and/or contextual input) and updated remotely from a set of master databases via a network service and/or from a local database.

The alternate views may be applied on a global (e.g., a country or several countries), region (e.g., regions within a country), application (e.g., an online catalog or store . . . ), device (e.g., portable media player, vehicle media player, etc.), and/or user-account level. All such changes at the presentation information architecture layer may be achieved without altering the underlying master granular media identifiers, descriptor codes, labeling data, and file tags.

The master media, information architecture, contextual data, and user profile databases may be refined and appended based on feedback from the clients and thus be modified based on user input.

The navigation system may be used to power various applications running on any device rendering media including a search, a recommendation, playlisting, internet community facilitation, stores, on-demand subscription services, and the like.

FIG. 1A illustrates an example navigation system 100. As mentioned above, the system 10 may be deployed on any device that renders media (e.g., a portable media player, a vehicle media player such as a vehicle audio systems, etc.). The navigation system 100 may include a client 102 in the form of an application or a device. The client 102 may receive architecture information (e.g., selected category lists 122) from a plurality of descriptor systems 104.1-104.n that may be used to enable the client 102 to navigate content from a plurality of media sources 106.1-106.n (e.g., a radio station, a flash drive, an MP3 player . . . ) and/or a media service 108 (e.g., provided on a media player or by an online catalog) by use of a client application 110.

The client application 110 may provide navigational access to content through a user interface 112. The user interface 112 may provide navigational information and other information to an end-user through a display device (e.g., on a device) or an application.

Navigation templates 114 may access one or more descriptor hierarchies 116 available to the client 102 through the user interface 112 to provide one or more navigation views.

Master descriptor code list 124 associated with content may be used to enable navigational access to the content (e.g., audio, video, or the like) by mapping it to selected descriptor category lists 122 that are contained within the descriptor hierarchies 116. The descriptor codes may describe an attribute an entity of a media item. The selected category lists 122 may be selected from the plurality of available category lists 132 contained within a plurality of the descriptor systems 104.1-104.n. In an example embodiment, the master descriptor code list 123 of the client may not include all master descriptor codes of the master descriptor code list 124 of a descriptor system 104.1.

A descriptor system 104.1 includes a master descriptor code list 124 from which master descriptor code list 124 may be selected. The master descriptor code list 124 may include a list of a plurality of available master descriptor codes and associated names for a particular type of media descriptor. For example, the master descriptor code list 124 for a genre media descriptor may include coded identification of a greatest amount of granularity desired for genre. By way of example, the master descriptor code list 124 for genre may include, e.g., more than fifteen hundred different genres). For example, the master descriptor code list 124 may be a detailed genre list used for coding media items such as artists, albums, and recordings. The master descriptor code list 124 for a particular type of descriptor may optionally be given a unique identifier that may be used for identification.

In an example embodiment, by linking the master descriptor code that is associated with the media items 134 to the corresponding master descriptor code in the master descriptor code list 124, the media item may be associated with the descriptor categories by mapping the media item to the master descriptor code.

The most granular descriptor category list of the available category lists 132 may be referred to as the master descriptor category list. The master descriptor codes are mapped directly into the master descriptor category list, which may contain an equal or smaller number of categories than there are codes in the master descriptor code list 124.

By maintaining the master descriptor category list separately from the other descriptor category lists, maintenance of the descriptor system 104.1 may be simplified. The mapping from the master descriptor code list 124 to each of the other descriptor category lists may not need to be directly updated as the mapping from the master descriptor category list to each of the other descriptor category lists may remain unchanged.

The plurality of available category lists 132 (e.g., the descriptor category list) may include a number of levels of category lists as part of each descriptor system. Each category list may include a differing number of category codes and associated labels from the other category lists in the descriptor system. For example a category list at a first level may include five category codes and associated labels and at a second level may include twenty category codes and associated labels. The most granular level of the plurality of available category lists 132 may be referred to as a master descriptor category list.

Each descriptor category code in each descriptor category list in each descriptor system may be mapped to its parent descriptor category code in the next less granular descriptor category List. A number of child category codes may be mapped to each parent category code. The mapping may have an indirect effect of mapping each master descriptor code to its appropriate parent category in every category list via the master descriptor category list, and mapping every category code to its appropriate parent and child category code in every non-adjacent category list. The mappings from the master descriptor codes to the descriptor category codes may also be stored directly. Each descriptor code may be a unique identifier.

To enable data annotation by end-users, artists, venue/label/content/broadcast partners, internal experts or others using the more simplified category lists, rather than the highly granular master descriptor lists, mapping may be used.

A one to one "downward" mapping 130 may be created and stored for each descriptor category. As the descriptor categories may generally be of more aggregate nature than many of the master descriptor codes, the descriptor categories may typically be mapped to the more aggregated master descriptor codes to ensure than only the level of information actually known is encoded. The user interface presented to the submitter may only display the applicable hierarchy of category lists, from which they select the annotation labels. Once selected, the item may be annotated with the mapped master descriptor code. For example, a venue operator may "publish" the music genres that are primarily associated with the venue, but do so by selecting from a simplified list of fifteen meta-genres.

A descriptor system 104.1 may be created for each desired viewpoint. The viewpoints of the descriptor system 104.1 may be defined by a combination of regional, genre preference, psychographic, demographic and/or other factors that combine to define a preferred perception of the applicable descriptor types. Examples of viewpoints of descriptor systems 104.1 include North American Default, Japanese Classical Aficionado. South American, Youth, and Southern European Traditional.

To provide for a more useful user interface 112, different descriptor systems 104.1-104.n may group the same master descriptor code list 124 into substantially different category arrangements. The grouping may enable the ability to substantially change the areas of category focus in different implementations while utilizing the same master descriptor codes. For example, a European genre descriptor system might include the genre "Chanson" in its shorter, more highly aggregated genre category lists, as a European end-user may desire quick access to music of this type, whereas for a North American genre descriptor system, the genre category might only be exposed at the lower levels, if at all, with content coded with "Chanson" master descriptor codes instead being included along with music from other related master genre codes in a genre category of "World".

Navigational content 120 may be used to enhance navigational access on the user interface 112. The navigational content 120 may be provided during navigation to identify content and may include, by way of example, audio clips, media packaging graphics, photos, text, genre icons, genre mini-clips, genre descriptions, origin icons, origin mini-clips, origin descriptors, navigational icons (e.g., channel icons), phonetic data, and the like.

A recognition module 125 may be further included in the client to recognize media items 134.1, 134.2. The recognition module 125 may optionally use a local database 127 and/or a remote database 129 to perform look and/or obtain metadata for the media items 134.1, 134.2. An example embodiment of a method for recognizing the media items 134.1, 134.2 that may be performed at the recognition module 125 is described in greater detail below.

Figure 1B:
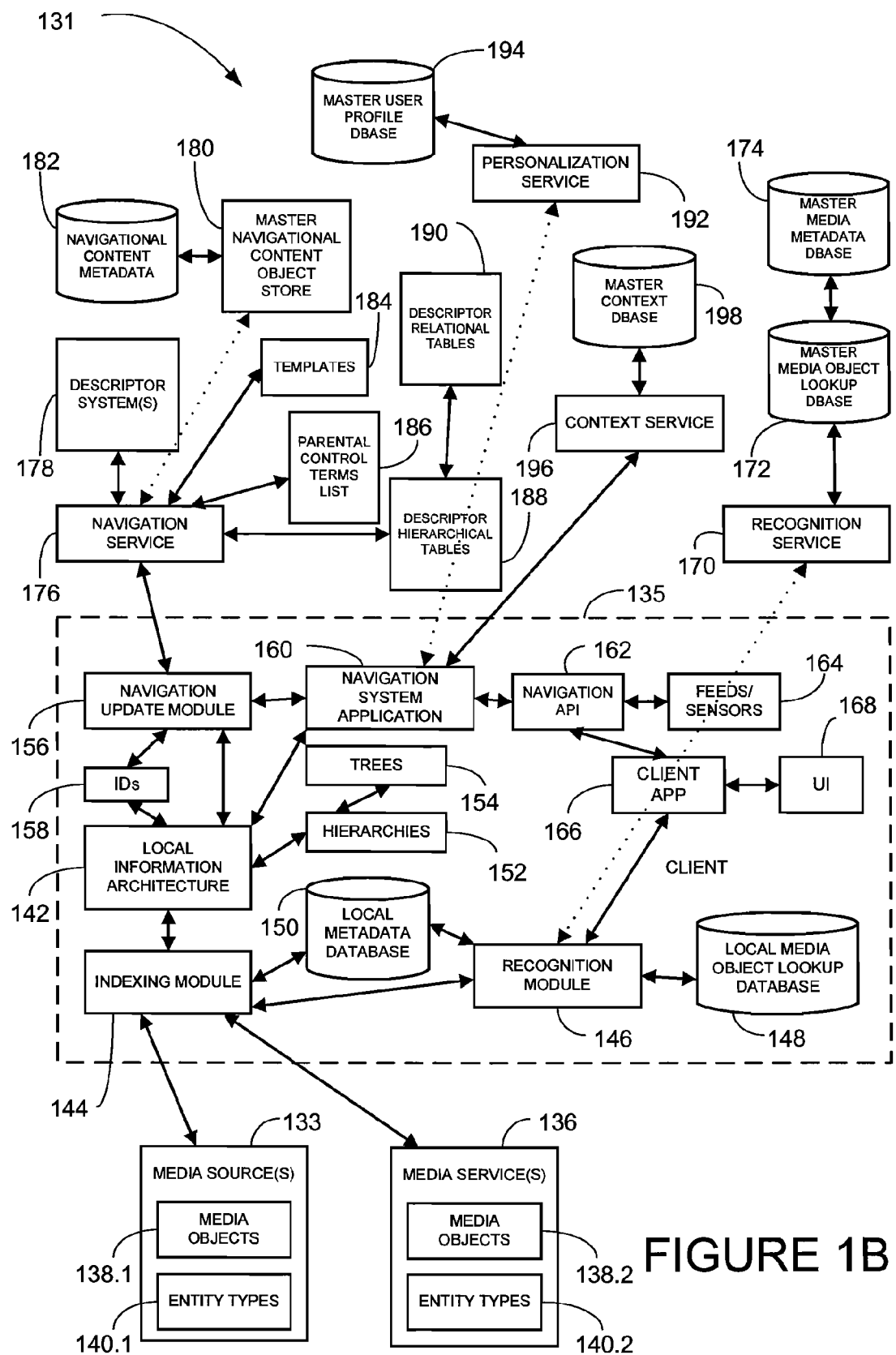

FIG. 1B illustrates another example of a navigation system 131 in which a client may be deployed.

The navigation system 131 may include a client 135 that may have access to media objects 138.1 from one or more media sources 133 and media objects 138.2 from one or more media services 136. The media objects 138.1 may be associated with entity types 140.1, while the media objects 138.2 may be associated with the entity types 140.2. The media objects 138.1, 138.2 may be accessed through an indexing module 144 by a local information architecture 142.

The media objects 138.1, 138.2 may be recognized by use of a recognition module 146. The recognition module 146 may use a local media object lookup database 148 to identify the media objects 138.1, 138.2 to assemble a local metadata database 150 of metadata for the media objects 138.1, 138.2. The recognition module 118 may also, instead of or in addition to the local lookup, perform a remote lookup by contacting a recognition service 170. The recognition service 170 may use a master media object lookup database 172 to identify the media objects 138.1, 138.2 and a master media metadata database 174 to obtain metadata for the media objects 138.1, 138.2.

The local information architecture 142 may be used by a navigation system application 160 to configure various navigational views as described in greater detail below. The navigation system application 160 may configure the navigational views according to a personalization module and/or a contextualization module.

Hierarchies 152 and navigation trees 154 may be generated from the local information architecture 142 and used to provide the navigational views. The hierarchies 152 and the navigation trees 154 may optionally be stored and available for later retrieval.

A navigation API 162 may be used to provide access to the navigation system application 160. One or more contextual data feeds and/or sensors may be used to provide contextual data through the navigation API 162 to the navigation system application 160. Personalized data may also be received from a master user profile database 194 by use of a personalization service 192.

A navigational update module 156 may be used to update the local information architecture 142. The navigation update module 156 may optionally use one or more IDs 158 which may identify a build ID, a device ID, an application ID, a customer ID, a region ID, a taste profile ID, a user type ID, a client ID, and/or a user ID to receive the appropriate updates for the local information architecture 142 as deployed.

A navigation service 176 may provide updated information to the navigation update module 156. The navigation service 176 may obtain information used for navigation (e.g., navigational content) from one or more descriptor systems 178 and navigational content from a master navigation content object store 180, utilizing a navigational content metadata database 182. The navigational content may be provided to aid in navigation and may include, by way of example, audio clips, media packaging images, text, genre icons, genre mini-clips, genre descriptions, origin icons, origin descriptors, channel icons, phonetic data, and the like.

One or more navigation templates 184 may be accessed by the navigation service 176. The navigation templates 184 may enable differing navigational views into one or more descriptor hierarchies 152 available to the client 135 through the user interface 168.

One or more navigation templates 184 may be accessed by the navigation service 176. The navigation templates 184 may enable differing navigational views into one or more descriptor hierarchies 152 available to the client 102 through the user interface 138.

Descriptor codes associated with content in the local metadata database 150 may be used to enable navigational access to the content by mapping content to selected category lists that are contained within the descriptor hierarchies 152. The selected category lists may be selected from the plurality of available category lists contained within a plurality of the descriptor systems 178.

The plurality of available category lists may include a number of levels of category lists. Each category list may include a differing number of category codes and associated labels. For example, a category list at a first level may include five category codes and associated labels and at a second level may include twenty category codes and associated labels.

Figure 2:
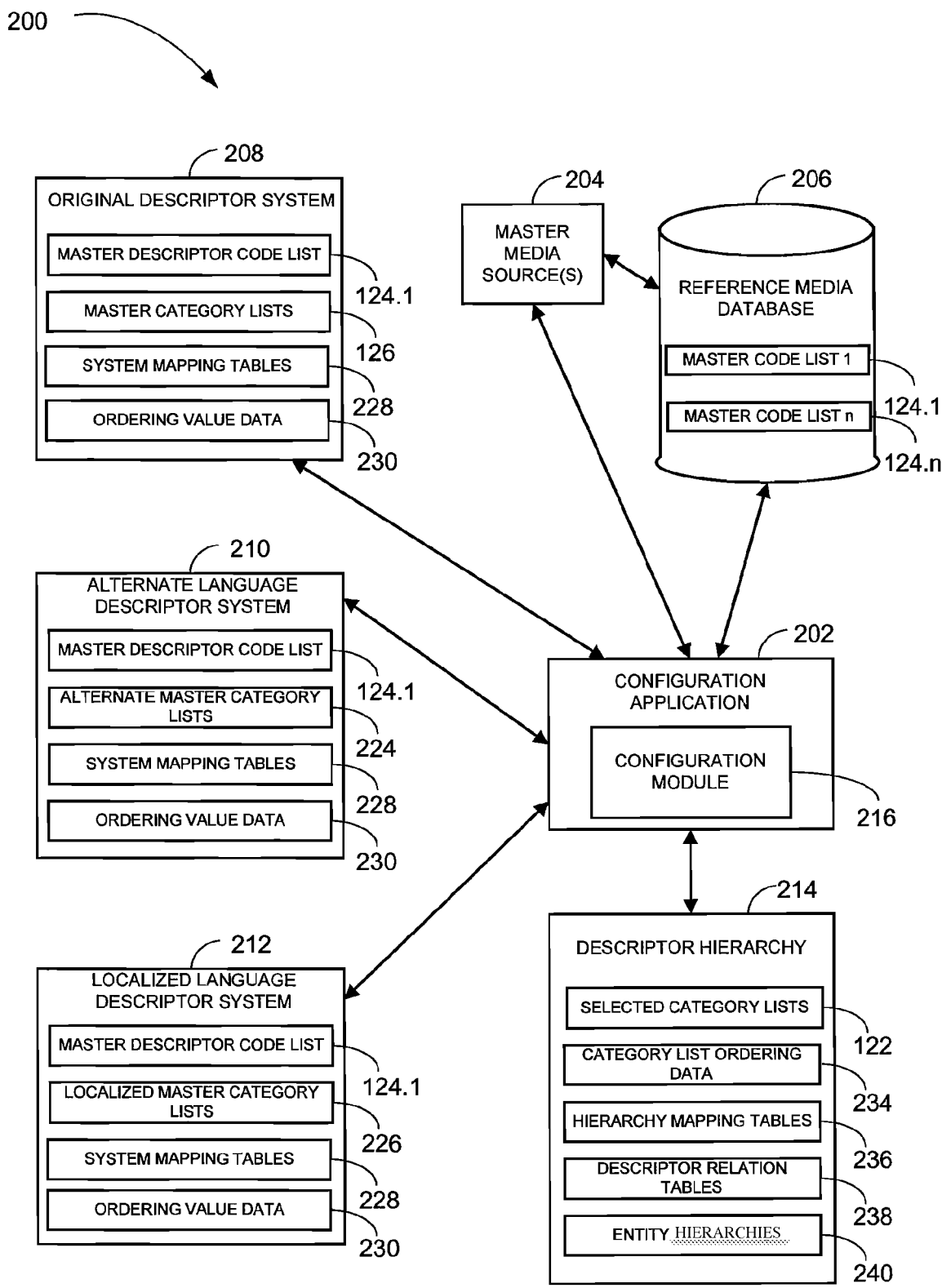
FIG. 2 is a block diagram of an example configuration system.

FIG. 2 illustrates an example configuration system 200. The configuration system 200 may be used to create one or more hierarchies 116 from the descriptor systems 104.1-104.n for use in the navigation system 100 (see FIG. 1).

The configuration system 200 includes a configuration application 202 in which a configuration module 216 may communicate with one or more master media sources 204 and a reference media database 206. The configuration application 202 may utilize one or more master descriptor code lists 124.1-124.n for content (e.g., media items) available through the master media sources 204. A master code descriptor list 124.1 of the master descriptor code lists 124.1-124.n may be provided to a plurality of descriptor systems 208, 210, 212.

The configuration application 202 may also create a descriptor hierarchy 214 from an original descriptor system 208 or an alternate viewpoint descriptor system 210. From each of these, an alternate label and/or a translated language descriptor system 212 may also be created.

The original descriptor system 208 includes the master descriptor code list 124 (see FIG. 1), third party descriptor label mappings, third party descriptor ID mappings, master category lists 126, other category lists, system mapping tables 228, and ordering value data 230. The third party label and identifier mapping tables may associate third party labels (e.g. genre label "R&R") or IDs (e.g. ID3 Genre tag #96) with the appropriate master descriptor code.

$3^{rd}$ party mapping tables associate descriptor term labels and descriptor term unique identifiers utilized externally to the most appropriate master descriptor code for each applicable descriptor type. If more than one 3rd party system uses an identical descriptor label, this one label may be mapped to the single "best-fit" master descriptor code, or alternatively, the system may store a 3rd party organization ID with each instance of a descriptor label, such that it is possible to support alternate mapping form 3rd party descriptor to master descriptor code, depending on the source, as indicated by the 3rd party entity identifier. In the case of mapping 3rd party descriptor unique identifiers, it is always necessary to include the 3rd party organization ID. External descriptor labels do not have to be associated with a specific entity; they may represent colloquial expressions.

The ordering value data 230 may optionally be associated with the category lists 126 of the descriptor systems 208, 210, 212. The ordering values for each of the categories indicate an order in which the labels of a category list may be presented in the user interface 112 (see FIG. 1). For example, the ordering values may be based on judgmental similarity, judgmental importance, judgmental chronological, and the like.

The labeled hierarchy 210 may be assembled from a specific descriptor system 208 with specific labels associated with each category ID. The labeled hierarchy 210 includes the master descriptor code list 124, labeled category lists 224, the system mapping tables 228, and the ordering value data 230. The alternate master category lists 224 may include one or more alternate labels for the category lists contained in the master category lists 126. For example, the alternate labels may include nicknames, short names, and the like.

The translated hierarchy 212 is a version of a labeled hierarchy 210 with translated labels (e.g., in Spanish, Japanese, and English). The localized language descriptor system. The translated hierarchy 212 includes the master descriptor code list 124, translated labeled category lists 226, the system mapping tables 228, and the ordering value data 230.

The descriptor hierarchy 214 may include the selected category lists 122 (see FIG. 1), category list ordering data 234, hierarchy mapping tables 236, descriptor relational tables 238, and entity hierarchies 240. The selected category lists 122 may be selected from the master category lists 126, the alternate master category lists 224, and/or the localized master category lists 226.

The category list ordering data 234 may enable one or more alternate orderings of the category lists of the descriptor hierarchy 214.

The third party mapping tables 236 (e.g., tables provided by a third party content provider) may associate descriptor terms and unique identifiers used by third parties to the master descriptor codes contained in the master descriptor code list 124. For example, a third party descriptor term may be mapped to a master descriptor code to which it is most similar. Thus discrepancies in terminology used may be accommodated.

The descriptor relational tables 238 relate master descriptor codes with other master descriptor codes in the master descriptor code list 124. The relations may be defined by a correlation value or a weighting for each relationship.

The entity hierarchies 240 define the parent/child relationship between at least some of the entity types. An example of an entity item hierarchy is as follows: Series <-> Album <-> Edition <-> Release <-> SKU <-> Disc <-> Track <-> Recording <-> Movement <-> Composition.

Figure 3:
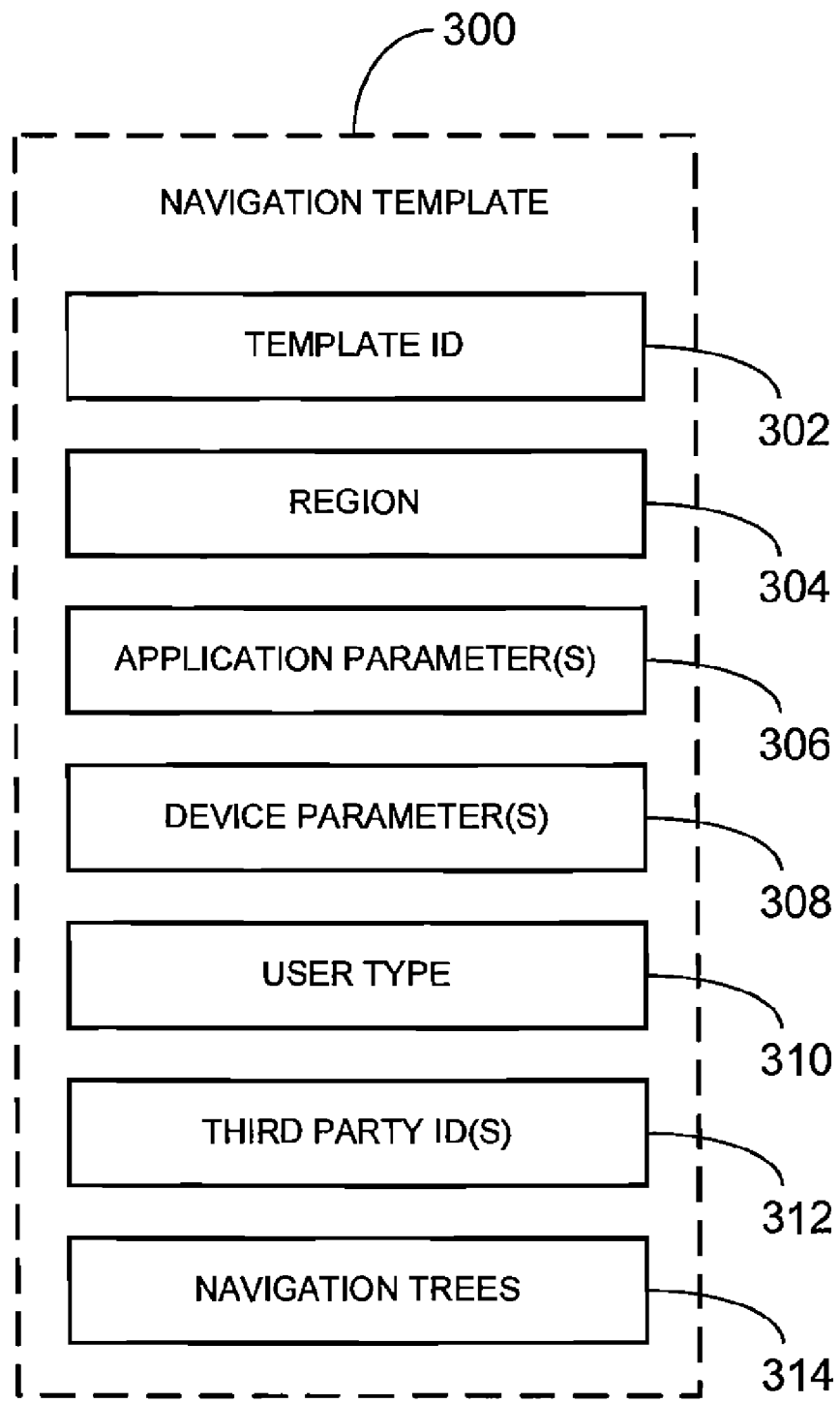
FIG. 3 is a block diagram of an example navigation template.

FIG. 3 illustrates an example navigation template 300. The navigation template 300 may be used by a navigation service to select the appropriate elements to be included in a navigation package. The client may utilize these elements to assemble navigation views for navigating content from one or more media sources 106.1 -106.n and/or the media library 108 (see FIG. 1).

The navigation template 300 may include a template ID 302, a region 304, one or more application parameters 306, one or more device parameters 308, a user type 310, one or more third party IDs 312, and/or one or more navigation trees 314.

The region 304 may define the regional viewpoint that is used to select the appropriate descriptor systems and other navigational elements such that they can be assembled into a user interface that conforms to the cultural expectations of a specific regional user base. For example, the selection of the region may include the United States, Germany, Brazil, Japan, Korea, the Middle East, China, global, Eurasia, America, and/or Asia, U.S. East Coast, New England States, Chicago, and the like. Other regions may also be available for selection.

The region 304 may define the regional viewpoint that is used to select the appropriate descriptor systems and other navigational elements such that they can be assembled into a user interface that conforms to the cultural expectations of a specific regional user base. For example, the selection of the region may include the United States, Germany, Brazil, Japan, Korea, the Middle East, China, global, Eurasia, America, and/or Asia, U.S. East Coast, New England States, Chicago, and the like. Other regions may also be available for selection The one or more application parameters 306 indicate the application type (e.g. media player, a web site, a playlist generator, a collection manager, or other application) in which the navigation package may be deployed. For example, the application parameters 306 may cause alternate category labels to be made selected such as short names, standard names, or extended names.

The one or more device parameters 308 specify the device in which the navigation package may be deployed. For example, the device parameters 308 may indicate whether the device is a PC, a home media server, a vehicle stereo, a portable media player, a mobile phone, a digital media adapter, a connected CD/DVD/flash player, a remote control, and the like.

The user type 310 may identify a type of user that may use the deployment of the navigation template 300 in the client 102. For example, the user type may identify a user of the navigation template 300 as a basic user, a simple user, a standard user, an advanced user, or a professional user. Other user types may also be used.

The one or more third party IDs 312 may identify third parties associated with a deployment of the navigation template 300. The third party IDs may be associated with third party customers and/or partners that have IDs (e.g., unique IDs) that define their navigational preferences for the end-user, as well as IDs of third parties whose labels or IDs may need to be mapped via the appropriate third party mapping tables.

The one or more navigation trees 314 may be a sequence of category lists taken from selected category lists 122 and/or entity types to be available for constructing elements of the user interface 112 based on the selection of the application parameters 306, the device parameters 308, the user type 310, and/or the other third party IDs 312. The navigation trees 314 may also include an ordering of items in a category list. The list ordering definition may include a judgmental unique ordering, alphabetical, dynamic item count, a dynamic popularity, or the like.

Figure 4:
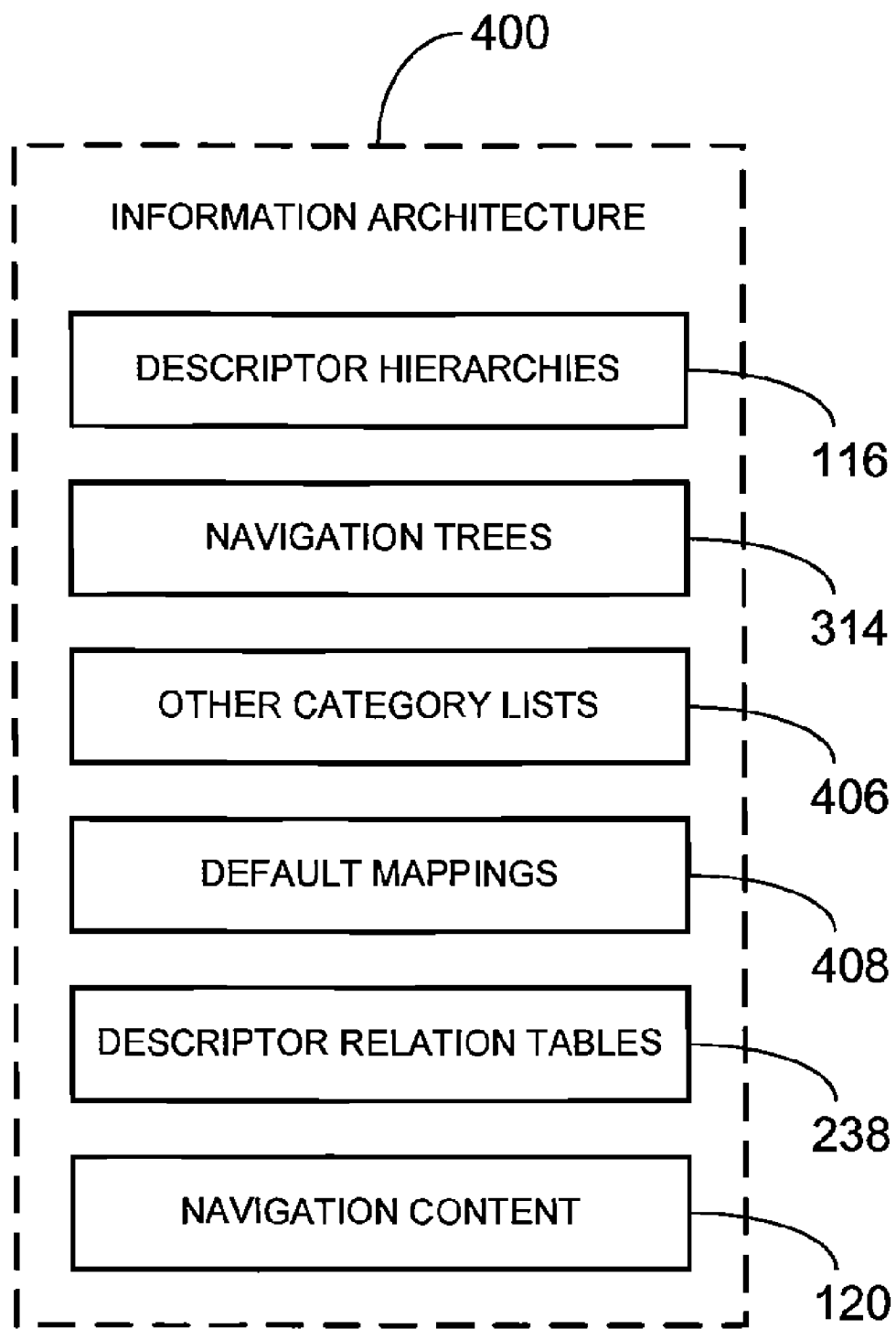
FIG. 4 is a block diagram of an example information architecture.

FIG. 4 illustrates example information architecture 400. The information architecture may be deployed in the client 102 (see FIG. 1) and/or in other applications and devices. The information architecture 400 may include one or more descriptor hierarchies 116, one or more navigation trees 314, one or more other category lists 406, default mappings 408, one or more descriptor relation tables 238, and/or navigational content 120 (see FIGS. 1-3).

The other category lists 406 may selected from one or more descriptor hierarchies 116 not included in the information architecture 400. The default mappings 408 may be used in the information architecture 400 to enable mapping of legacy descriptors IDs (e.g., from a provide or a third party) and/or to perform third party descriptor label mapping. Other configurations of the information architecture 400 including different elements may also be deployed in the client 102.

Figure 5:
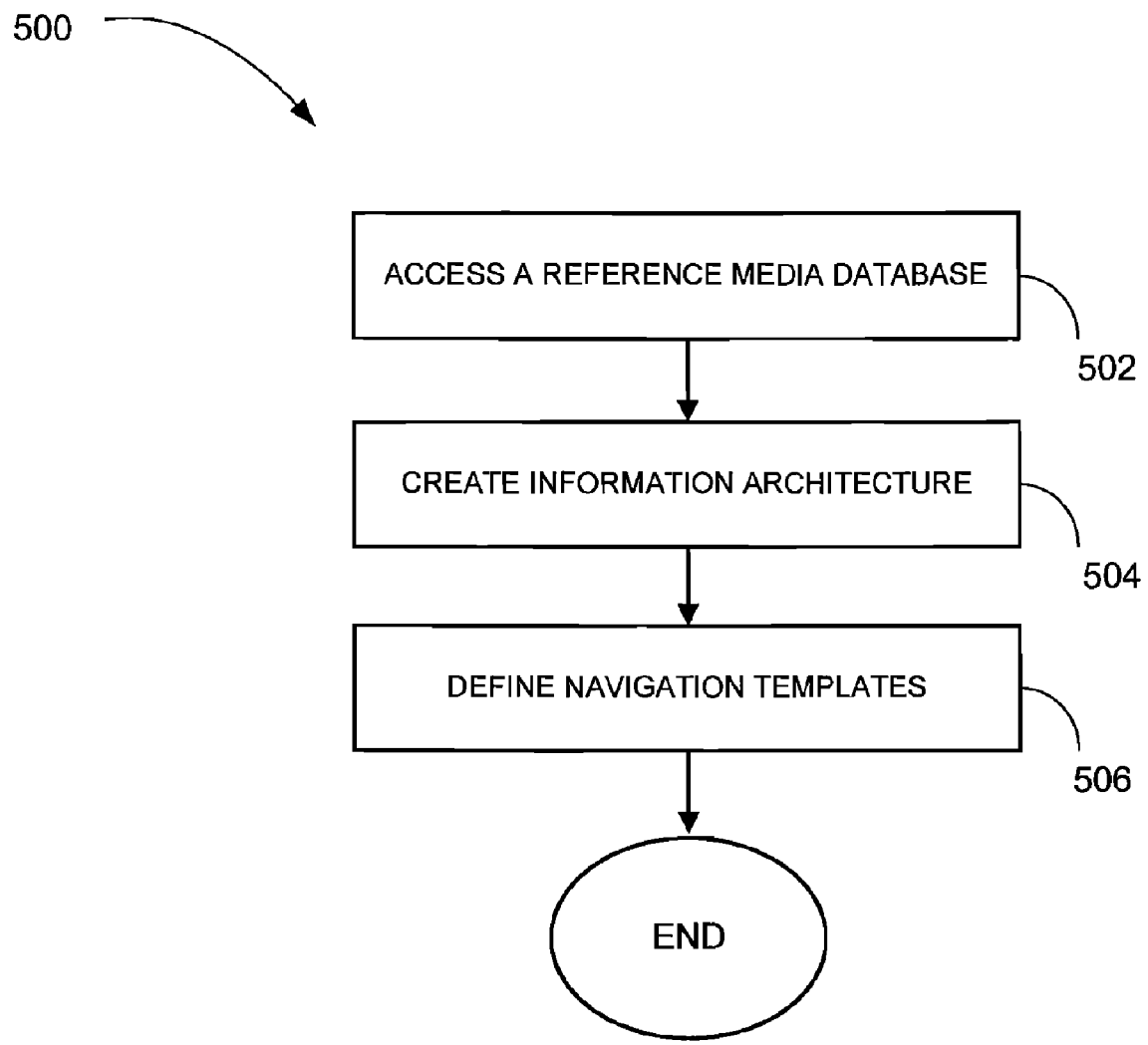
FIG. 5 is a flowchart illustrating a method for pre-processing the configuration system of FIG. 2 in accordance with an example embodiment.

FIG. 5 illustrates a method for pre-processing content to enable deployment of the information architecture 400 (see FIG. 4) in the client 102 (see FIG. 1) for navigation of the content in accordance with an example embodiment.

The reference media database 206 may be created at block 502. Upon creation, the reference media database 206 may include the plurality of master descriptor code lists 124.1-124.n. An example embodiment of creating the reference media database 206 is described in greater detail below.

Information architecture 400 (see FIG. 4) may be created at block 504. An example embodiment of creating the information architecture 400 is described in greater detail below.

A navigation template 300 (see FIG. 3) may be defined at block 506. An example embodiment of defining a navigation template is described in greater detail below.

Figure 6:
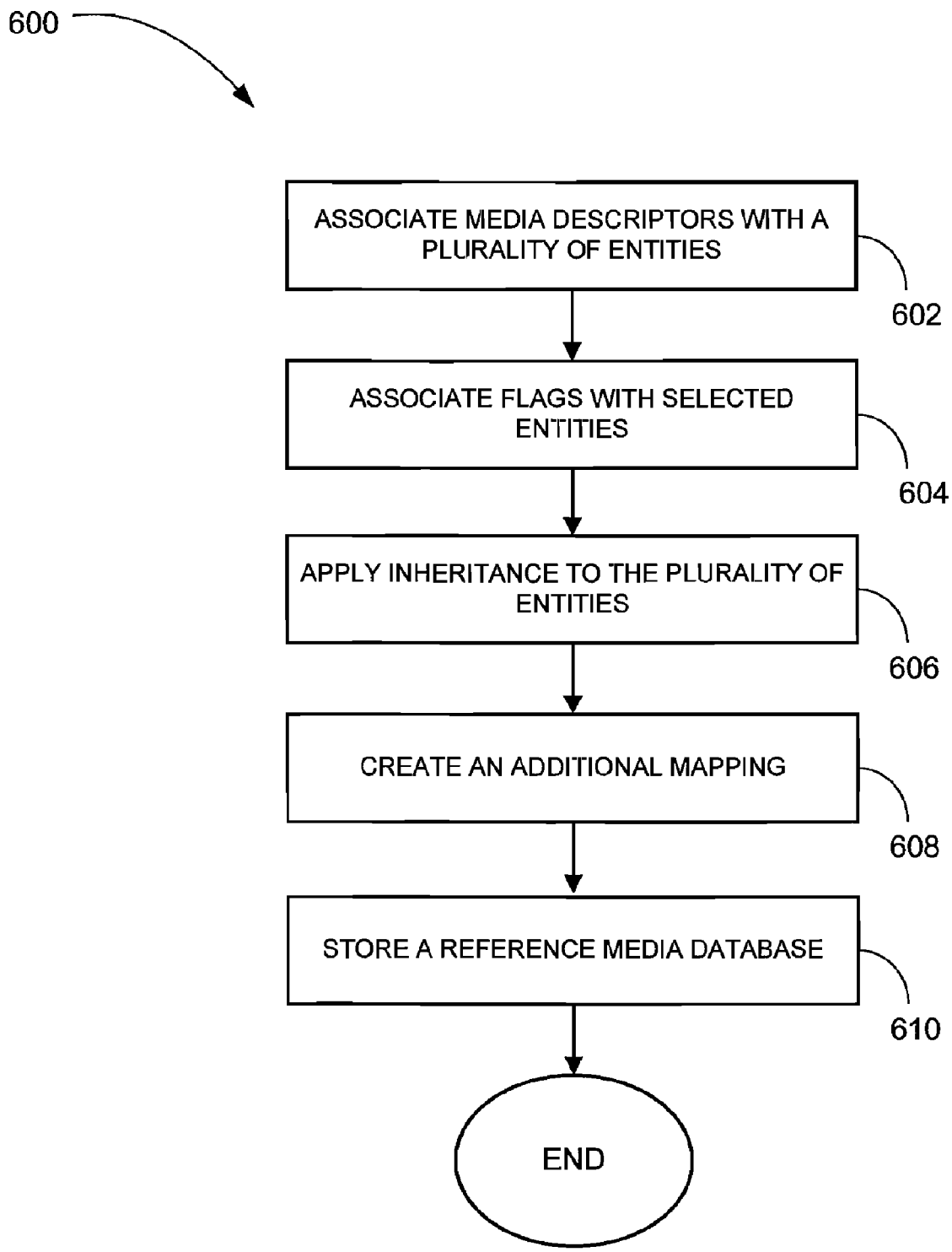
FIG. 6 is a flowchart illustrating a method for creating a reference media database in accordance with an example embodiment.

FIG. 6 illustrates a method 600 for creating a reference media database 206 (see FIG. 2) according to an example embodiment. In an example embodiment, the method 600 may be performed at block 502 (see FIG. 5). The reference media database 206 created through the operations of the method 600 may be used in the configuration system 200; however it may also be used in other systems.

Media descriptors may be associated with a plurality of entities at block 602. The plurality of entities may be from a single media source 106.1 (e.g., from a single content provider or fixed disk), the plurality of media sources 106.1-106.n, and/or the media library 108 (see FIG. 1). For example, the entities may include a channel, a stream, a station, a program, a slot, a playlist, a web page, a recording artist, a composer, a composition, a movement, a performance, a recording, a recording mix track, a track segment, a track, a release, an edition, an album, an album series, a graphic image, a photograph, a video segment, a video, a video still image, a TV episode, a TV series, a film, a podcast, an event, a location, and/or a venue. Other entities may also be used.

The media descriptors may use an identification (ID) code to identify a characteristic of an entity with which it is associated. For example, the ID code used with the media descriptors may include a genre ID code, an origin ID code, a recording era ID code, a composition era ID code, an artist type ID code, a tempo ID code, a mood ID code, a situation ID code, a work type ID code, a topic ID code, a personal historical contextual IDs, a community historical contextual ID code, a timbre ID code, and the like. Other ID codes may also be used with the media descriptors to identify characteristics of entities.

Each of a particular type of ID code may be associated with a single master descriptor code list 124. For example, the genre ID codes may be on a genre master descriptor code list where each genre ID code is associated with a genre label, and the mood ID codes may be on a mood master descriptor code list where each mood ID code is associated with a mood label.

A particular entity may be associated with a plurality of media descriptors. One or a plurality of media descriptors with a same type of code (e.g., a genre ID code) may be associated with an entity. The media descriptors may optionally be given a ranking and/or weighting to indicate their relevance among other media descriptors. For example, an album may be associated with a primary media descriptor of blues and a secondary media descriptor of rock, where the primary media descriptor is ranked higher than the secondary media descriptor.

A determination of which media descriptors to associate with an entity may optionally be based on information received from one or more data sources. For example, the data sources may include content information received from providers (e.g., label data feeds and/or content registries), expert editorial information, individual community submissions, collaborative community submissions, digital signal processing (DSP) analysis, statistical analysis, and the like.

One or more flags may optionally be associated with one or more entities of the plurality of entities at block 604. The flags may be used to identify a certain type (e.g., a special type) of entity that may receive special handling during navigation. For example, a flag may be used to indicate that an entity is a various artist compilation, a soundtrack, a holiday related theme (e.g., Christmas), an interview, and/or a bootleg recording. Other types of flags may also be used to identify other certain types of entities that may receive special handling during navigation.

Inheritance may be applied to the plurality of entities at block 606. Applying inheritance to the plurality of entities may enable access for at least some of the plurality of entities to selected media descriptors associated with one or more other entities. Inheritance may optionally be used to reduce an amount of media descriptors associated with a plurality of entities based on the relationship among the entities. The use of inheritance may provide greater efficiency and/or scalability of the reference media database 206.

By way of an example, a set of media descriptors may be associated with a recoding artist. For an album of the recording artist where the media descriptors differ from the set of media descriptors associated with the recording artist, a set of media descriptors may be associated for the album. When the individual recordings of the artist differ from that of an album on which the recordings were recorded, a set of media descriptors may be associated with the individual recordings. If one or more individual segments of a recording differ from a parent recording, a set of media descriptor may be associated with the individual segments.

Inheritance may be applied to entities in a cascading down manner (e.g., cascading down inheritance) to provide for inheritance from a parent and/or in a cascading up manner (e.g., cascading up inheritance) to provide for inheritance from a child. Inheritance may be applied in a cascading down manner when a child entity does not have directly associated media descriptors. The child entity may then inherit the media descriptors associated with a parent entity. For example, if a genre ID code is associated with a recording artist and an album does not have an associated genre ID code, the album may inherit the genre ID code of the recording artist. If a recording on the album does not have an associated genre ID code, the recording may inherit the genre ID code of the album.

Inheritance may be applied in a cascading up manner when a parent entity does not have directly associated media descriptors. The parent entity may then inherit the media descriptors associated with a child entity. For example, if a genre ID code is associated with one or more recordings and an album containing the recordings does not have associated genre ID code, the album may inherit the genre ID code associated with the most common genre ID code from its recordings. If an artist who recorded a plurality of recordings has not been associated with a genre ID code, the artist may inherit the most common genre ID code associated with albums associated with the artist.

An additional mapping may be created for the reference media database 206 at block 608 to provide for an additional association among at least two entities of the plurality of entities. For example, an alternate artist billing may be mapped to a primary artist ID code and/or an individual artist ID code may be mapped to a collaboration artist ID code. Other additional mappings may also be created.

The reference media database 206 may optionally be stored at block 610. The reference database 206 may include the association of the media descriptors with a plurality of entities, the association of a flag with the selected entities of the plurality of entities, applied inheritance to the plurality of entities, and/or the additional mapping among at least two entities of the plurality of entities.

Figure 7:
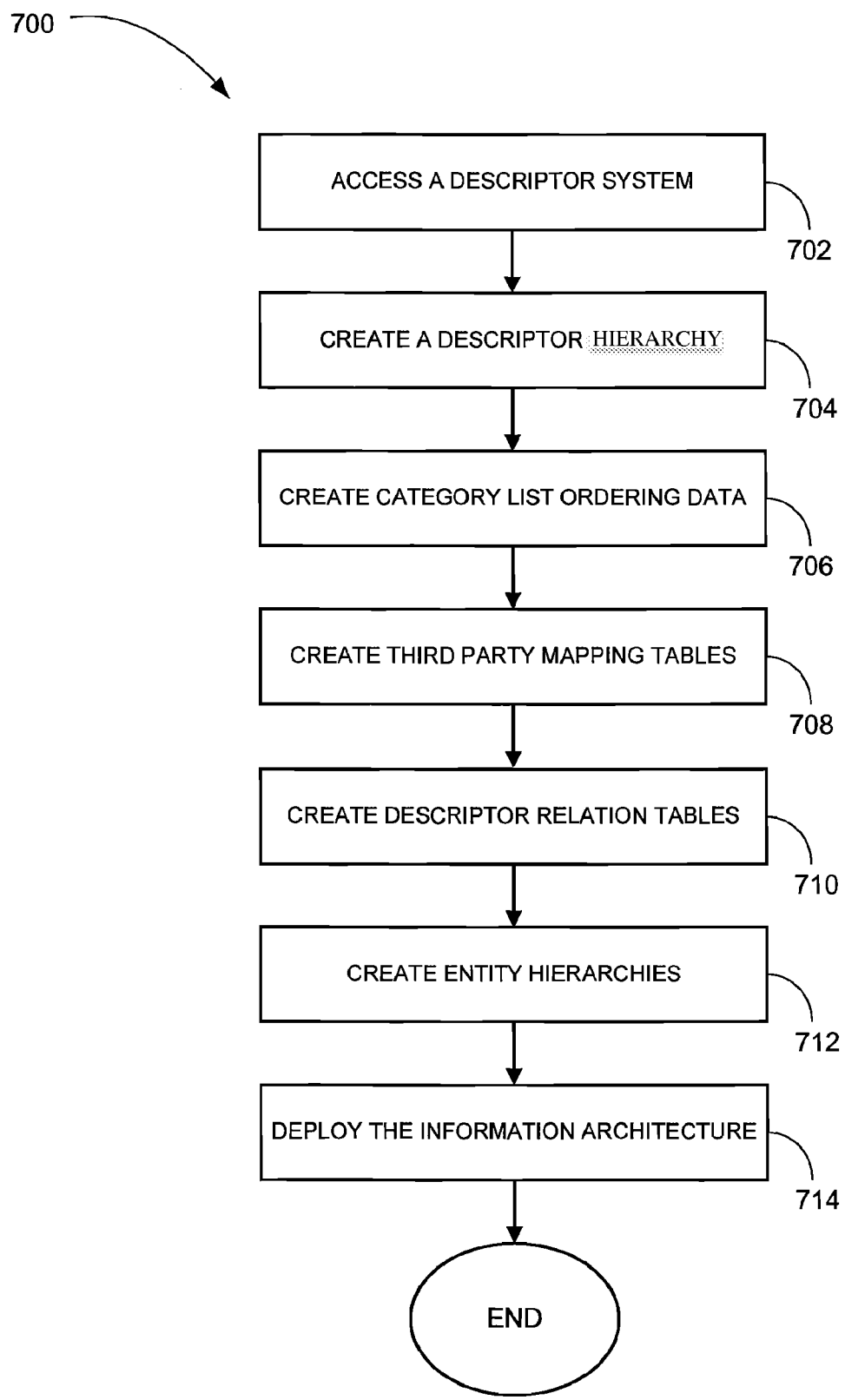
FIG. 7 is a flowchart illustrating a method for creating an information architecture in accordance with an example embodiment.

FIG. 7 illustrates a method 700 for creating an information architecture 400 (see FIG. 4) that may be deployed in a client 102 (see FIG. 1) according to an example embodiment. In an example embodiment, the method 700 may be performed at block 504 (see FIG. 5).

A descriptor hierarchy 116 (see FIG. 1) may be created at block 704. The descriptor hierarchy 116 may be created by selecting from a plurality of available category lists 132 of a corresponding descriptor type and mappings from the upward mapping 128 and/or downward mapping 130 associated with the selected category lists 232. The descriptor system 104 thereby may act as having a superset of available category lists 132 from which the selected category lists 232 of the descriptor hierarchy 116 are selected.122.

A descriptor hierarchy 116 (see FIG. 1) may be created at block 704. The descriptor hierarchy 116 may be created by selecting from a plurality of available category lists 132 of a corresponding descriptor type and mappings from the upward mapping 128 and/or downward mapping 130 associated with the selected category lists 232. The descriptor system 114 thereby may act as having a superset of available category lists 132 from which the selected category lists 232 of the descriptor hierarchy 116 are selected. 122.

A plurality of descriptor hierarchies 116 may be created for a particular descriptor type from one or more descriptor systems 104.1-104.n (e.g., an original descriptor system 208, an alternate language descriptor system 210, and/or a localized language descriptor system 212). Two or more of the multiple descriptor hierarchies 116 may be linked together (e.g., through pointers) to facilitate version selection during viewing.

The category list ordering data 234 may be created at block 706. The category list ordering data 234 may enable one or more alternate orderings of the selected category lists 122 of the descriptor hierarchy 214.

Third party mapping tables 236 may optionally be created at block 708. The third party mapping tables 236 may associate descriptor terms used by third parties to the master descriptor codes contained in the master descriptor code list 124.

Descriptor relation tables 238 may be created at block 710. In an example embodiment, the descriptor relation tables 238 may be created at a macro and micro level. At a macro level, a macro level correlate list may define correlation levels for the items on a single category list. At a micro level, correlation levels may be defined between master descriptor codes. The micro level may then be mapped to the macro level to create the descriptor relation tables 238.

The entity hierarchies 240 may be created at block 712.

The information architecture 400 created during the operations at blocks 702-712 may optionally be deployed in the client 102 at block 714.

Figure 8:
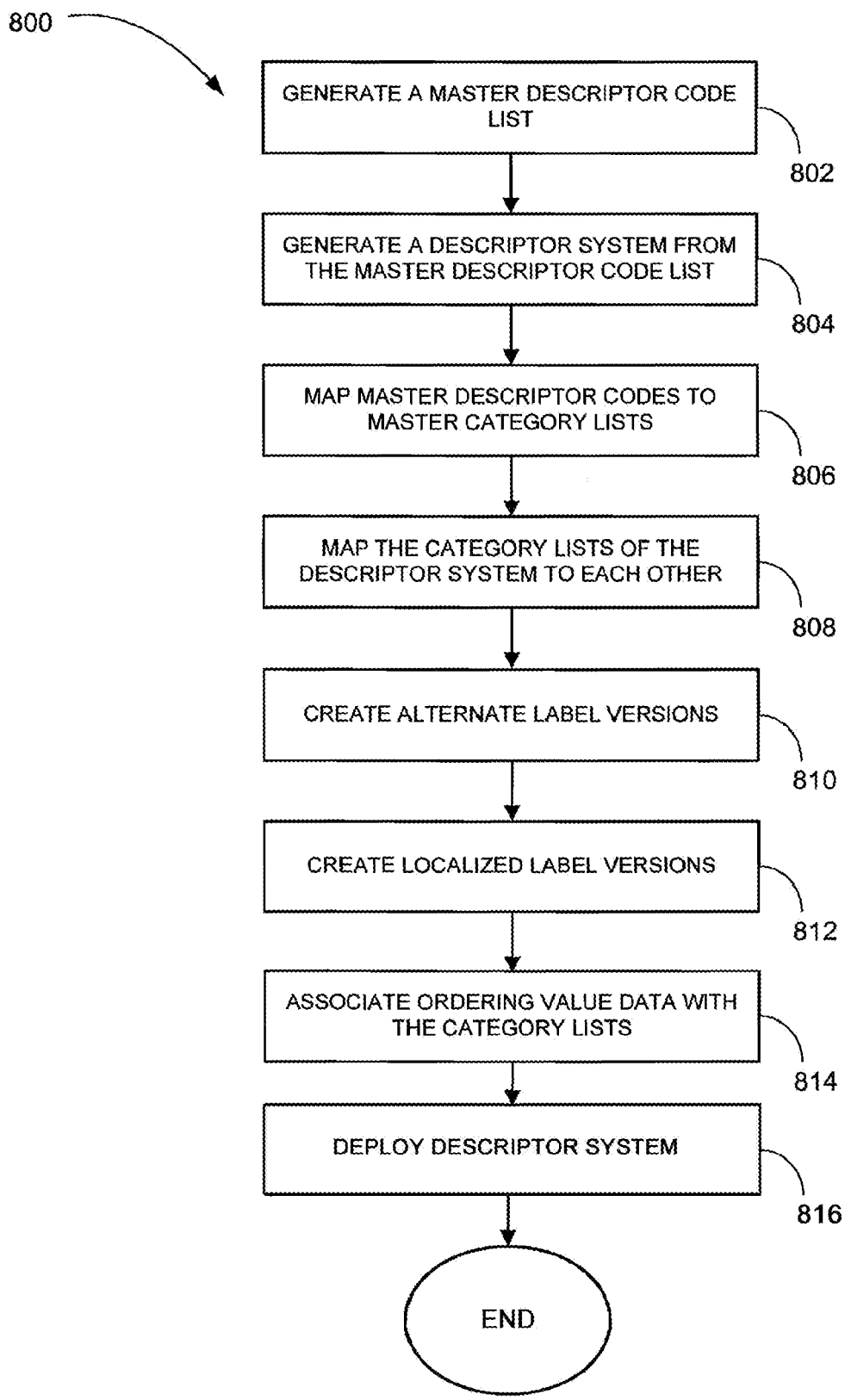
FIG. 8 is a flowchart illustrating a method for creating a descriptor system that may be deployed in the navigation systems of FIGS. 1A & 1B in accordance with an example embodiment.

FIG. 8 illustrates a method 800 for creating a descriptor system 104 that may be deployed in the navigation system 100 (see FIG. 1) or another system according to an example embodiment. The created descriptor system 104 may be accessed during the operations at block 702 (see FIG. 7).

A master descriptor code list 124 (see FIG. 1) may be generated at block 802. A media descriptor for which the master descriptor code list 124 may be generated may include, but is not limited to a genre media descriptor, an origin media descriptor, a recording era media descriptor, a composition era media descriptor, a time cycle media descriptor, an artist type media descriptor, a tempo media descriptor, a mood media descriptor, a situation media descriptor, or a topic media descriptor.

A descriptor system 104 may be generated from the master descriptor code list 124 at block 804. The descriptor system 104 is generated to include a plurality of available category lists 132. The available category lists 132 of the descriptor system 104 may be generated to include summarized versions of the master descriptor code list 124 with decreasing or increasing granularity. The summarized versions of the master descriptor code list 124 may include a lesser number of list entries.

The amount of list entries in a category list of the descriptor system 104 and the number of category lists in the descriptor system 104 may be selected to provide flexibility when selecting a number of category lists for deployment as a hierarchy 116 as described in greater detail below. Each category list may optionally be provided with a unique identifier.

A plurality of descriptor systems 104.1-104.n may optionally be created for a particular descriptor type, where each descriptor system 104 of the particular descriptor type may have a different number of category lists and each category list may include a different number of list entries. For example, a plurality of descriptor systems 104.1-104.n may be created for different region focuses (e.g., a global descriptor system, a US descriptor system, a Japan descriptor system, etc.), different genre focuses (e.g., general descriptor system, classical descriptor system, internal descriptor system, etc.), different mood focuses (e.g., smooth, excited, reflective, etc.) or the like.

Master descriptor codes may be mapped to a master category list 222 of the descriptor system 104 at block 806. The master category list 222 may be the category list of the descriptor system with the highest granularity (e.g., number of list entries). When the master category list 222 of a descriptor system is not a master list, more than one descriptor code may be mapped into a category code of a same list entry.

The category lists of the descriptor system 104 may be mapped to one another at block 808. The category codes of the category lists may be mapped to a category code of a parent category list (e.g., a less granular category list) in the descriptor system. The category codes of a parent category list may include one or more mappings from a category code of a child category list.

An alternate label version of the descriptor system 104 (e.g., the alternate language descriptor system 210) may be created at block 810. The alternate language descriptor system 210 may include the same category lists of the original descriptor system on which the alternate version is based, but contain the alternate master category lists 224 with an alternate language label substituted for some or all of the category names of the master category lists 222. The alternate language labels may include abbreviated names, short names, extended names, and the like. Multiple alternate language label versions of an original descriptor system 208 may be created.

A localized label version of the descriptor system 104 (e.g., the localized language descriptor system 212) may be created at block 812. The localized language descriptor system 212 may include a different label based on localization. For example, a localized label version of the descriptor system 104 may be in Japanese, Korean, German, French, and/or other different languages. A localized label version may be created for an original descriptor system 208 and/or the alternate language descriptor system 210.

Ordering value data may optionally be associated with the category lists of a descriptor system at block 814.

The information may then be deployed as a descriptor system 104 at block 816.

Figure 9:
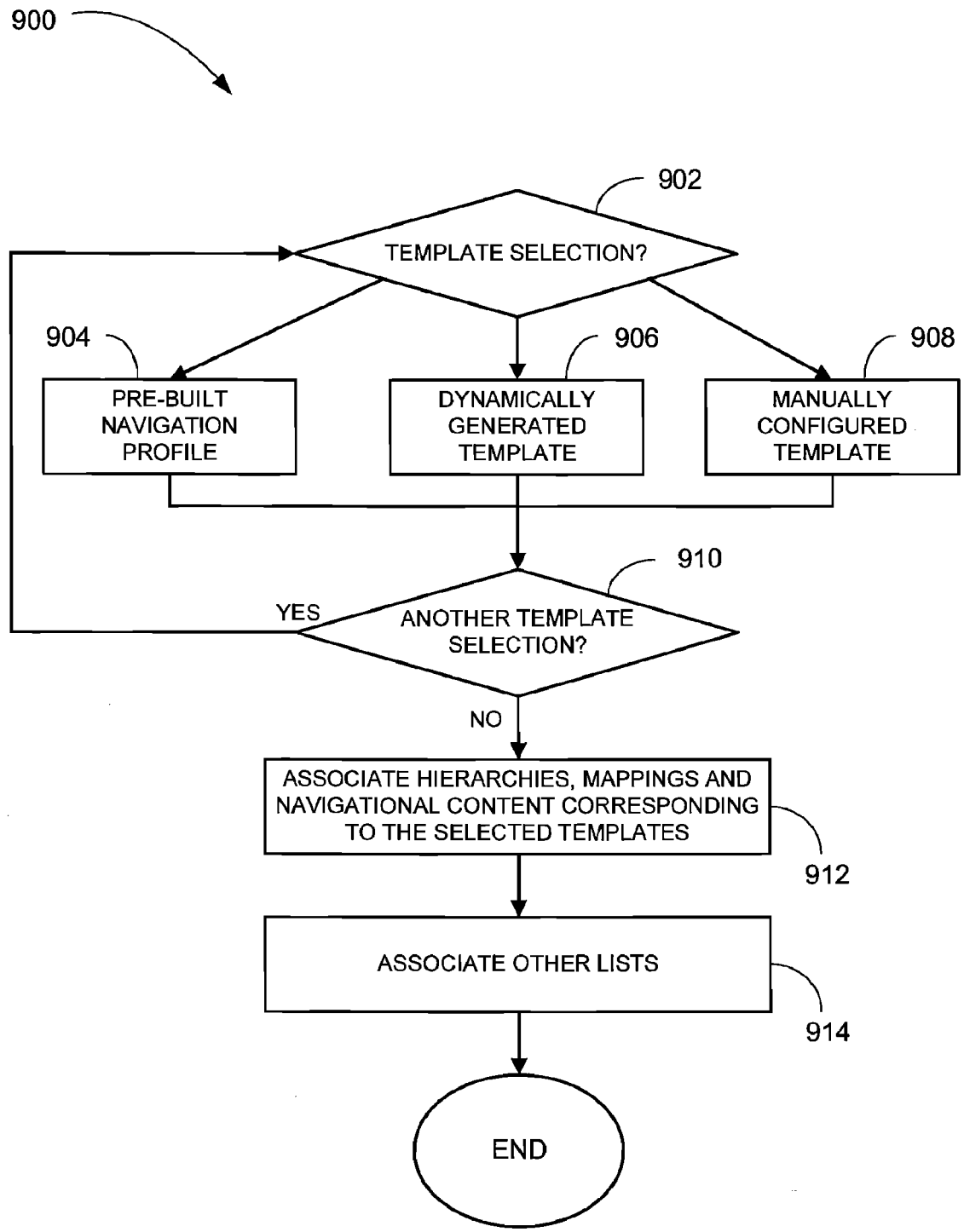
FIG. 9 is a flowchart illustrating a method for defining a navigation package in accordance with an example embodiment.

FIG. 9 illustrates a method 900 for defining a navigation package that may be deployed in a client 102 (see FIG. 1) according to an example embodiment.

A determination of a template selection for inclusion in a navigation package may be made at decision block 902. The determination may be made from explicit input, presence, data received from a geolocation service, dynamically, or the like. The template selection may be for a selection of a pre-built template at block 904, a dynamically generated template at block 906, or a manually configured template at block 908.

The pre-built template that may be selected at block 904 may be a navigation profile based on a common use case. The pre-built template may identify included descriptor hierarchies 116 and other information architecture elements that are associated with the template. The pre-built template may include a unique identifier to enable selection among other available templates. Examples of pre-built templates include pre-built templates for a basic user in the European market that plays classical music in a car using a media player, and a pre-built template for an advanced user in the Japanese market that plays music on a personal computer using a media player. Other pre-built templates may also be available for selection.

The dynamically generated template that may be selected at block 906 may be a template dynamically generated as needed based on use case parameters. The template may be dynamically generated by input regions and/or markets for deployment, taste/demographics/psychographic profiles(s), application and/or device type, user type, and/or customer/partner preferences. An example embodiment of dynamically generating a template is described in greater detail below.

The manually defined template that may be selected at block 908 may be manually defined based on a use case. For example, the manual selection may include:
  Default/alternate regions for a descriptor system selection,
  Default/alternate taste profiles (e.g., general, classical view, electronica view) for a descriptor system selection,
  A number of levels (e.g., category lists) from the descriptor system 104 for a descriptor hierarchy 116,
  Which category lists are used at each level of the descriptor hierarchy 116;
  Default and/or alternate languages,
  Label alternate terms,
  Label formatting alternatives (e.g., short names, full names, etc.),
  Text term mappings to master codes and other mappings,
  Navigational content 120, and/or
  Navigation trees 314.

Upon completion of the selection at block 904, block 906, or block 908, a determination may be made at decision block 910 whether to make another template selection for the navigation package. If a determination is made to make another template selection, the method 900 may return to decision block 902. If a determination is made not to make another selection at decision block 910, the method 900 may proceed to block 912.

Descriptor hierarchies 116, mappings and navigational content 120 corresponding to the selected templates may be associated with the navigation package at block 912.

Other lists may be associated with the navigation package at block 914. The other lists may include category lists not contained within the descriptor hierarchies 116.

Figure 10:
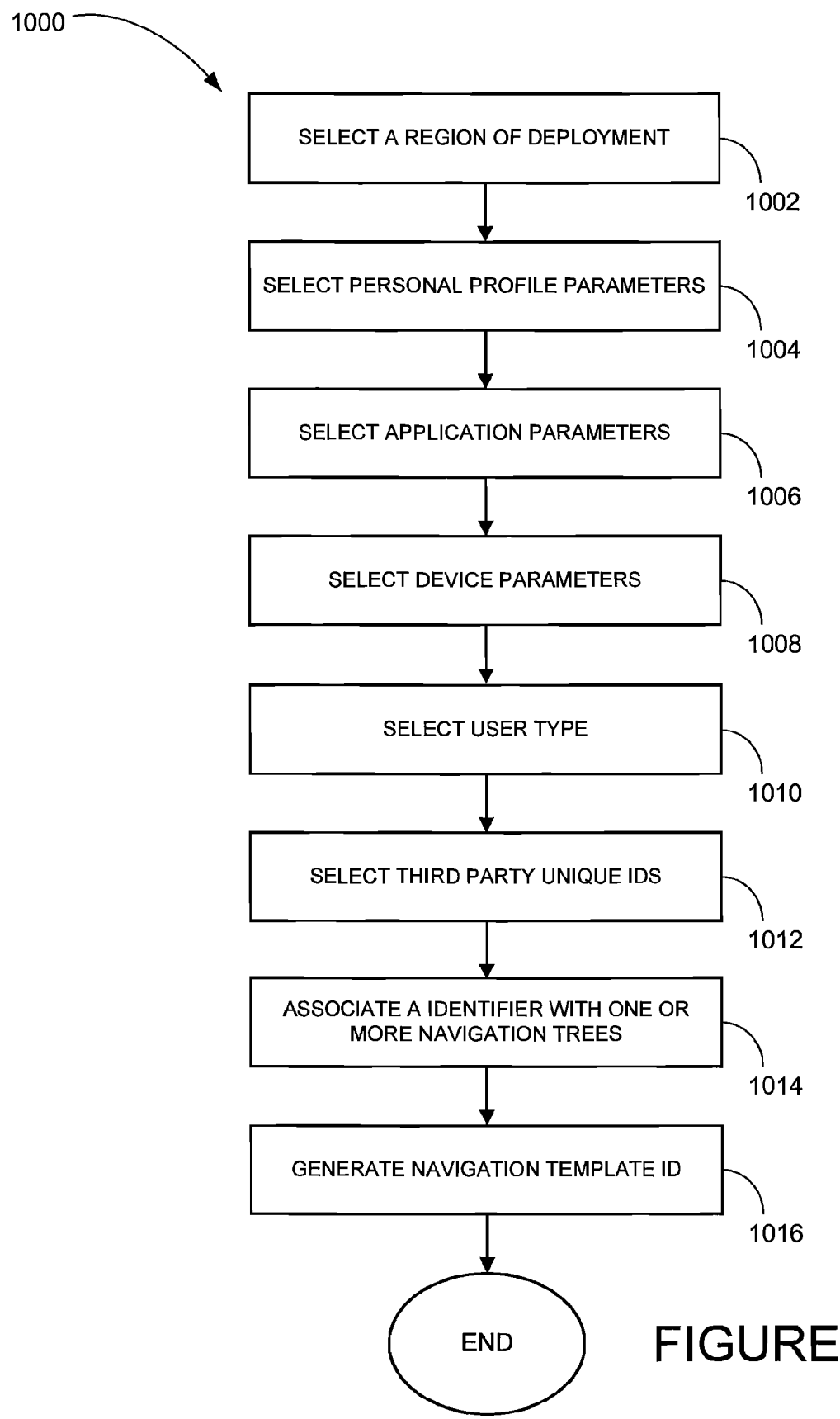
FIG. 10 is a flowchart illustrating a method for dynamically generating a navigation template in accordance with an example embodiment.

FIG. 10 illustrates a method 1000 for dynamically generating a navigation template 300 (see FIG. 3) for use in a navigation path according to an example embodiment. In an example embodiment, the method 1000 may be used to dynamically generate a template during the operations performed at block 906 (see FIG. 9).

A region for deployment may be selected at block 1002. The selection of the region may be used in determining which descriptor systems 104.1-104.3 will be used by the navigation template 300 and the default and/or alternate language labels that will be used to label the descriptor hierarchy 116.

The selection of the region may also be used in determining which navigational content parameters may be used. For example, the navigational content parameters may include basic, audio, graphic, voice, or advanced settings. The selection of the region may be used in determining which text terms may be use in a mapping set. For example, slang terms, regional dialect terms, professional terms, and the like may be used as text terms in the mapping set.

Personal profile parameters may be selected at block 1004. The personal profiles may include a taste profile, based on age, based on sex, based on historical information, explicit input, and the like. The taste profile may be a classical view, an electronica view, a boomer view, a generation X view, and the like.

The selection of the personal profile may be used in determining which taste profile variation may be selected. For example, the taste profile variation may be used in determining which view of the descriptor system 104 may be made. The selection of the personal profile may also be used in determining alternate label terms selected for labelling of the descriptor hierarchy 116. For example, the alternate labelling may include slang labels, regional dialect labels, informal labels, old school labels, and the like.

The selection of the personal profile may be used to determine which navigational content parameters and the related content parameters. For example, the related content parameters may include basic, audio, graphic, voice, or advanced settings. The selection of the personal profile may also be used determining the text terms for a mapping set.

Application parameters 306 (see FIG. 3) may be selected at block 1006. The selection of the application parameters may be used in determining a number of levels (e.g., a number of category lists) to include in a hierarchy system and label formatting parameters.

Device parameters 308 (see FIG. 3) may be selected at block 1008. The selection of the device parameters may be used in determining a number of levels (e.g., a number of category lists) to include in a hierarchy system, the length of category lists used at each level of the category list, and label formatting parameters. For example, the category list at each level may be twenty for a single level, ten and seventy-five for two levels, twenty-five, two hundred and fifty, and eight hundred for three levels, and five for each of four levels. The selection of the device parameters may also be used in determining the related content parameters.

A user type 310 (see FIG. 3) may be selected at block 1010. The selection of the user type may be used in determining the length of category lists used at each level of the category list.

Third party IDs 312 (see FIG. 3) may optionally be selected at block 1012. The selection of one or more third party IDs 312 may be used in determining which partner mapping selection may be used.

An identifier may be associated with a navigation tree 314 at block 1014. The navigation tree 314 may include a sequence of category lists that may be taken from selected hierarchies and/or entity types to be available for constructing UI elements based on the selection of application parameters, device parameters, user type, and/or other unique IDs.

Upon completion of the selections from the operations of blocks 1002-1012, a navigation template may be definable based on the selections that were made. A unique identifier may optionally be associated with one or more navigation trees at block 1014.

A template ID 302 (see FIG. 3) may be generated at block 1016. The identifier (e.g., a unique identifier) may be generated and stored based on the combination of the selected attributes of the navigation template 300. Unique IDs for the component attributes and the navigational profiles that drive the component attributes may also be associated with the identifier of the navigation template 300.

In an example embodiment, current updated version of corresponding descriptor hierarchies 116, the mappings 236 and the navigational content 120 may be retrieved based on the parameters in the navigation template. Other lists may also be retrieved for the use case.

Upon completion of the method 1000, a navigation package including default hierarchies 214, alternate hierarchies 214, mapping tables and navigational content 120 appropriate for the use case may be available for deployment.

Figure 11:
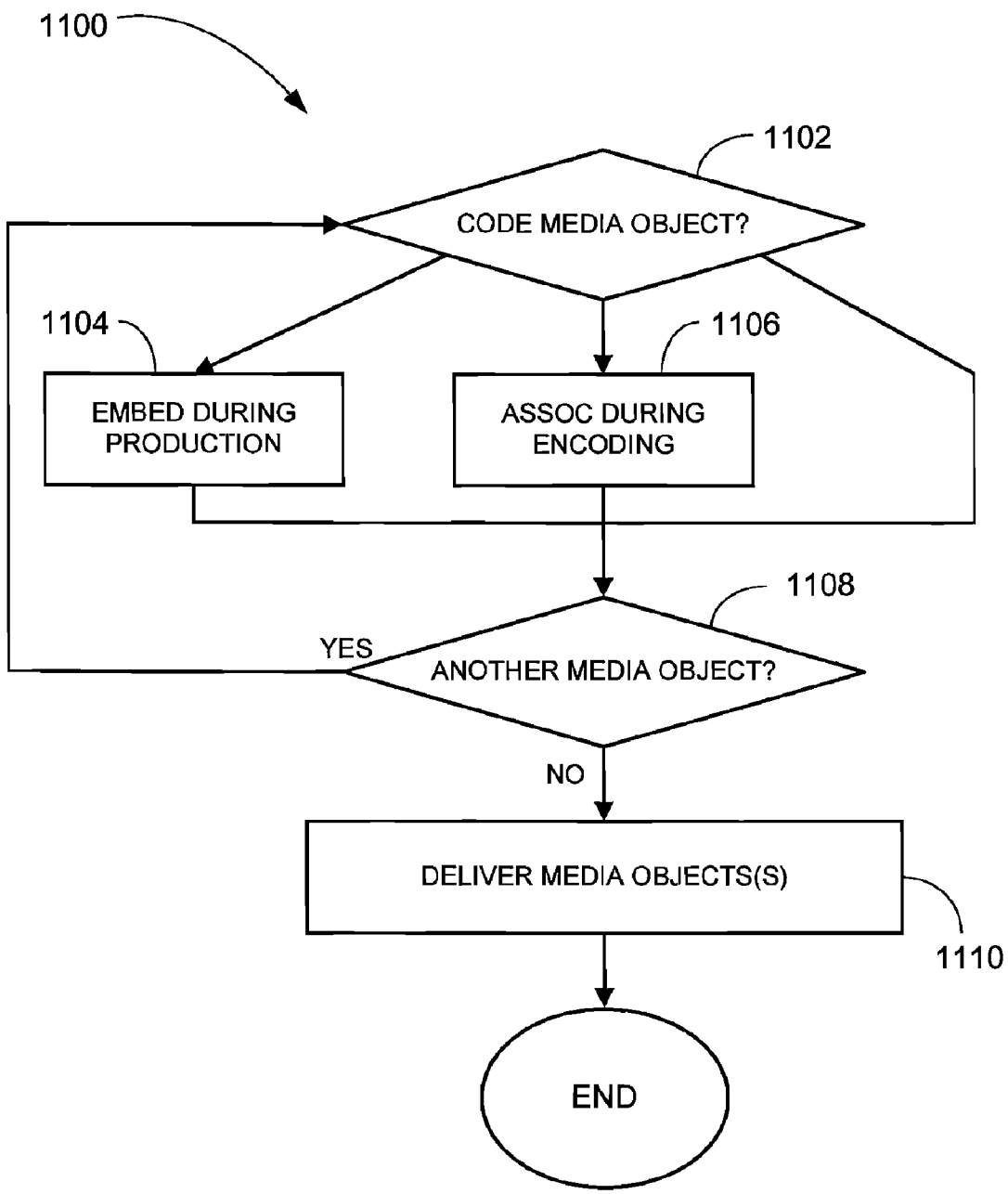
FIG. 11 is a flowchart illustrating a method for coding descriptor codes in media objects in accordance with an example embodiment.

FIG. 11 illustrates a method 1100 for coding descriptor codes in media objects according to an example embodiment. The media objects may be media available from the media sources 106.1-106.n and/or the media library 108 (see FIG. 1).

A determination may be made at decision block 1102 whether to code a media object (e.g., a media item). If a determination is made to code the media object, the media object may be embedded during production at block 1104 and/or during encoding at block 1106.

Identifiers and/or master descriptor codes may be embedded (e.g., as metadata containers) in media objects during production (e.g., during product and/or post-production) at block 1104. The embedded data may optionally be encrypted or otherwise obfuscated. The master descriptor codes may be associated with one or multiple entities of the media object.

Unique identifiers and/or master descriptor codes may be associated with media objects during encoding (e.g., during encoding and/or other processing step as part of distribution) at block 1106.

Examples of identifiers that may be embedded during the operations at block 1104 or associated at block 1106 include DDEX, GRID, MI3P ID, UPC, EAN, ISRC, ISWC, DOI ID, commercial IDs, public IDs (e.g., FreeDB), proprietary recording ID, proprietary album ID, or a proprietary composition ID. Other unique identifiers may also be embedded and/or associated.

If a determination is made not to code the media object at decision block 1102 or upon completion of the operations at block 1104 and/or block 1106, the method 1100 may proceed to decision block 1108.

At decision block 1108, a determination may be made code another media object. If a determination is made to embed another media object, the method 1100 may return to decision block 1102. If a determination is made not to embed another media item at decision block 1108, the media objects may be delivered at block 1110.

The media objects may be delivered with any metadata that has been embedded or associated. The delivery methods for providing the metadata with the media objects may include as part of a media object's exposed predefined tag field, in a proprietary tag field, as a watermark, as MPEG-7 data, as MPV or HiMAT Tag, in an FM sideband (e.g. RDS), in a satellite radio data channel, in a digital radio data channel, or in an Internet radio data stream (e.g. MPEG ancillary data). Other delivery methods may also be used.

Figure 12:
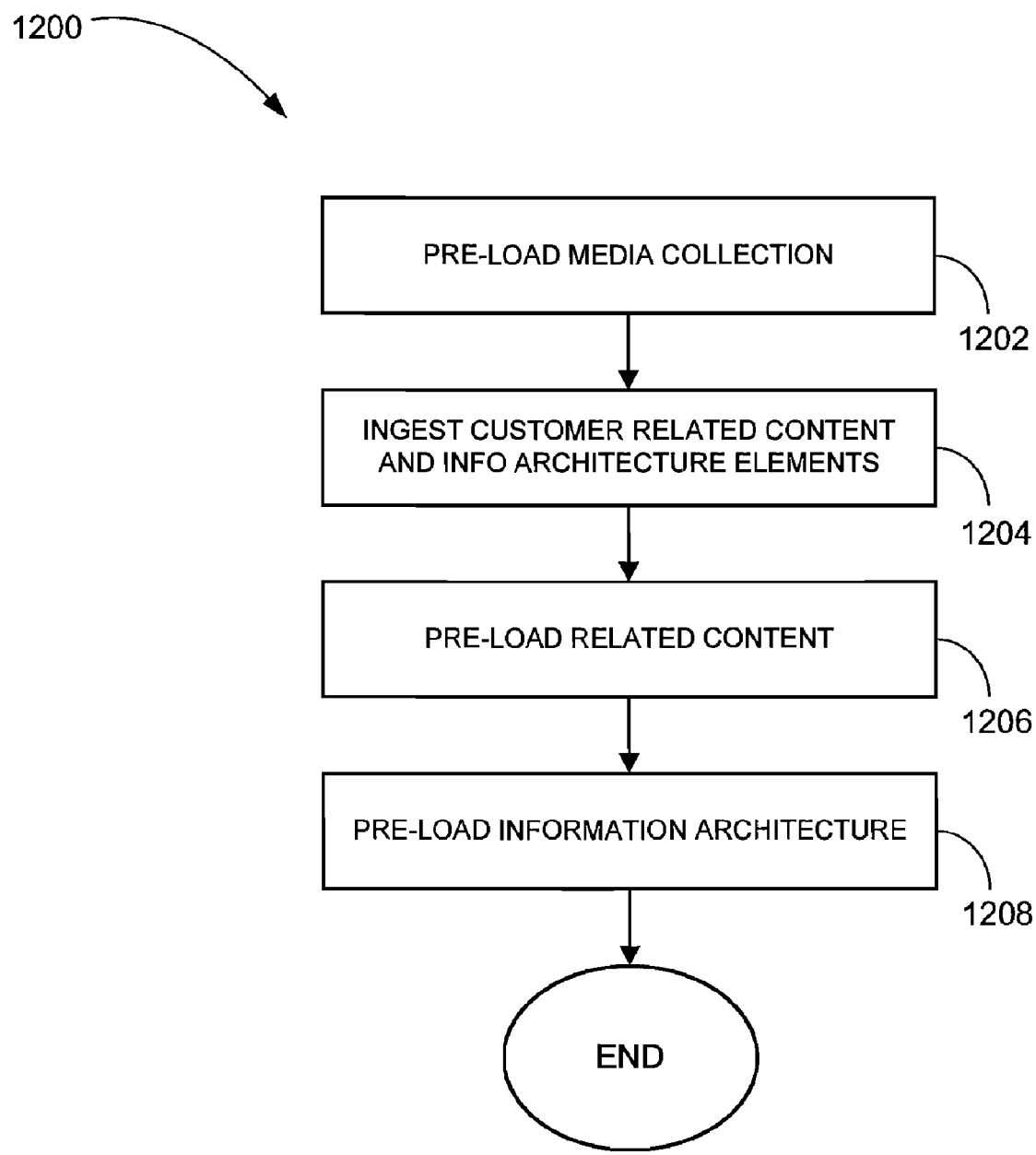
FIG. 12 is a flowchart illustrating a method for preloading a client in accordance with an example embodiment.

FIG. 12 illustrates a method 1200 for preloading a client 102 (see FIG. 1) according to an example embodiment.

A media collection may be pre-loaded on the client 102 at block 1202. The media collection may be pre-loaded prior to use by an end-user. The media collection may be the same for all of a number of units, a finite set of target libraries geared for a specific genre, regional, lifestyle, or other interest, or may be personalized based on a personal profile of an end-user. The media collection may include audio files, video files, image files, and the like.

Customer related content and information architecture elements may be ingested by the client 102 at block 1204.

Related content may be pre-loaded (e.g., prior to use by an end-user) on the client 102 at block 1206. The related content may include the navigational content 120 and/or other content. The other content may include album cover art, artist photos, concert posters, text artist factoids, lyrics, channel/ station logos, and the like.

The information architecture 400 (see FIG. 4) may be pre-loaded at block 1208. The information architecture may be made locally accessible and subject to customization based on the template ID 302 (see FIG. 3). The template ID 302 may be stored on the client 102 for future use. The preloaded information architecture 400 may include genre hierarchies, era hierarchies, origin hierarchies, navigation trees 404, mappings 236, ordering data, and station/channel directories.

Figure 13:
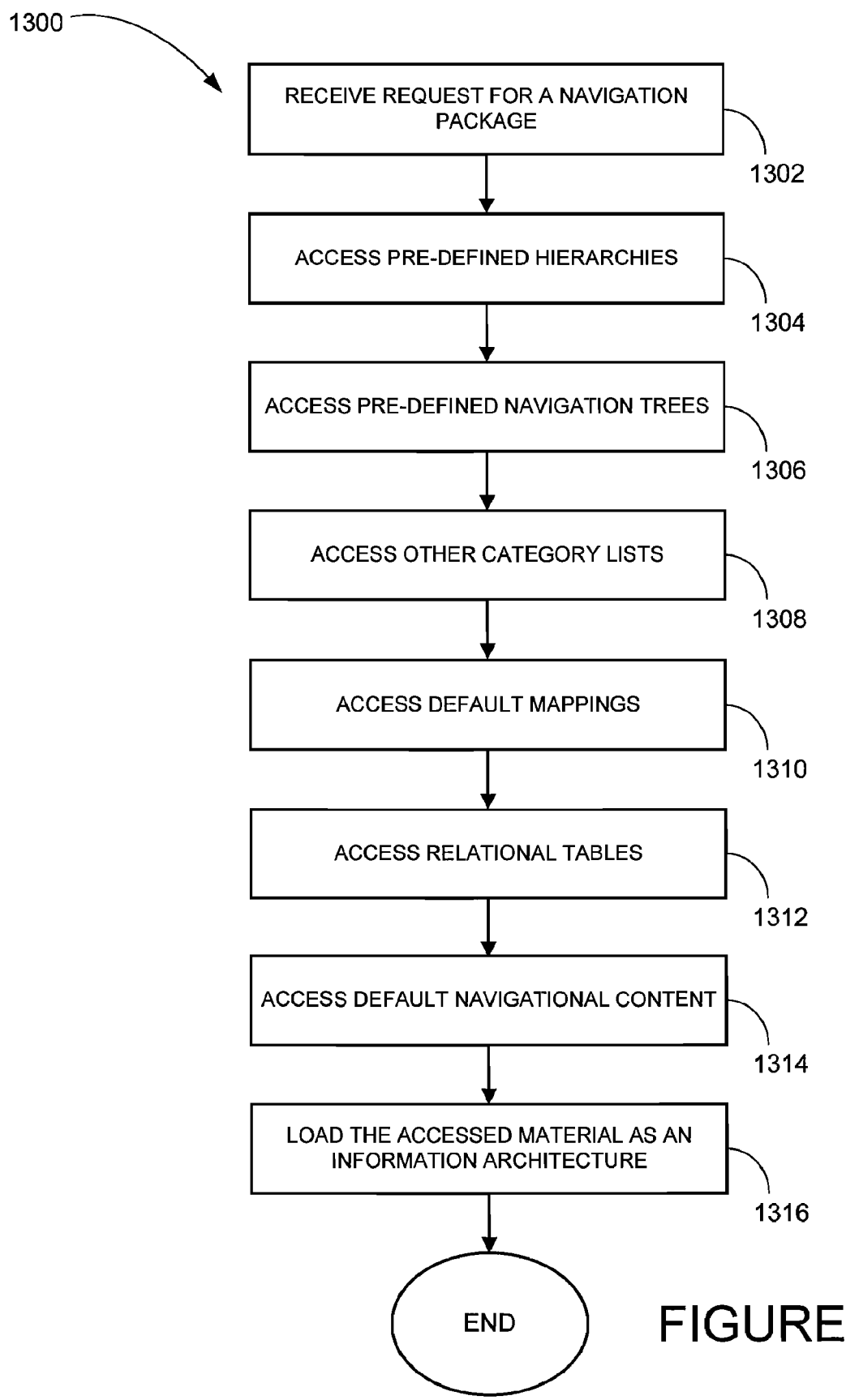
FIG. 13 is a flowchart illustrating a method for loading an information architecture in accordance with an example embodiment.

FIG. 13 illustrates a method 1300 for loading an information architecture 400 (see FIG. 4) according to an example embodiment.

A request may be received for a navigation package including an information architecture 400 at block 1302. The request may also be made by obtaining a device ID, generating a default template ID using the device ID, and/or issuing a request for a navigation package from the default template ID. Other methods for requesting the navigation package may also be used.

Predefined descriptor hierarchies 116 may be accessed at block 1304. A default descriptor hierarchy 116 and optionally alternate descriptor hierarchies 116 may be accessed for use in the information architecture 400. The descriptor hierarchies 116 may optionally be accessed based on the template ID 302. The alternate hierarchies 116 may be accessed from one or more different descriptor systems 104.1-104.n.

By way of example, the predefined descriptor hierarchies 116 that may be accessed include one predefined and one or several alternate genre hierarchies, a predefined and alternate origin hierarchies, a predefined and alternate artist type hierarchies, a predefined and alternate recording era hierarchies, a predefined and alternate composition era hierarchies, a predefined and alternate composition mood hierarchies, a predefined and alternate temp or rhythm hierarchies, a predefined and alternate composition theme/topic hierarchies, and the like.

Predefined navigation trees 314 may be accessed at block 1306. A default and optionally alternate navigation trees may be accessed for use in the information architecture 400. The navigation trees 314 may be accessed from one or more descriptor systems 104.1-104.n. The navigation trees may optionally be accessed based on the template ID 302.

By way of example, the navigation trees 314 may include genre/era/track, genre/mood/tempo/recording, artist/mood/year/track, and genre/album/mood/track. Other navigation trees 314 may also be used.

Other category lists 406 may be accessed at block 1308. The other category lists 406 may be used to generate alternate navigation trees 314, descriptor hierarchies 116, faceted navigation, or other local navigation options that have not been pre-defined. In an example embodiment, a descriptor system 104 may be retrieved to provide increased flexibility.

By way of example, the other category lists 406 may include a selected genre category list from a genre descriptor system, a selected origin category list from an origin descriptor system, a selected artist type category list from an artist type descriptor system, a selected recording era category list from a recording era descriptor system, a selected composition era category list from a composition era descriptor system, a selected mood category list from a mood descriptor system, a tempo category list from a tempo descriptor system, a selected theme/topic category list from a theme/topic descriptor system, and the like. The selected category lists may be supported by the client.

The default mappings 408 may be accessed at block 1310.

The descriptor relational tables 238 may be accessed at block 1312. A filter may optionally be applied to the descriptor relational tables 238 that are accessed to obtain relational data for relationships with weightings above a threshold level.

Navigational content 120 may be accessed at block 1314. The default navigational content may be accessed using a navigational content ID.

The accessed material may then be loaded in the client 102 as the information architecture 400 at block 1316.

Figure 14:
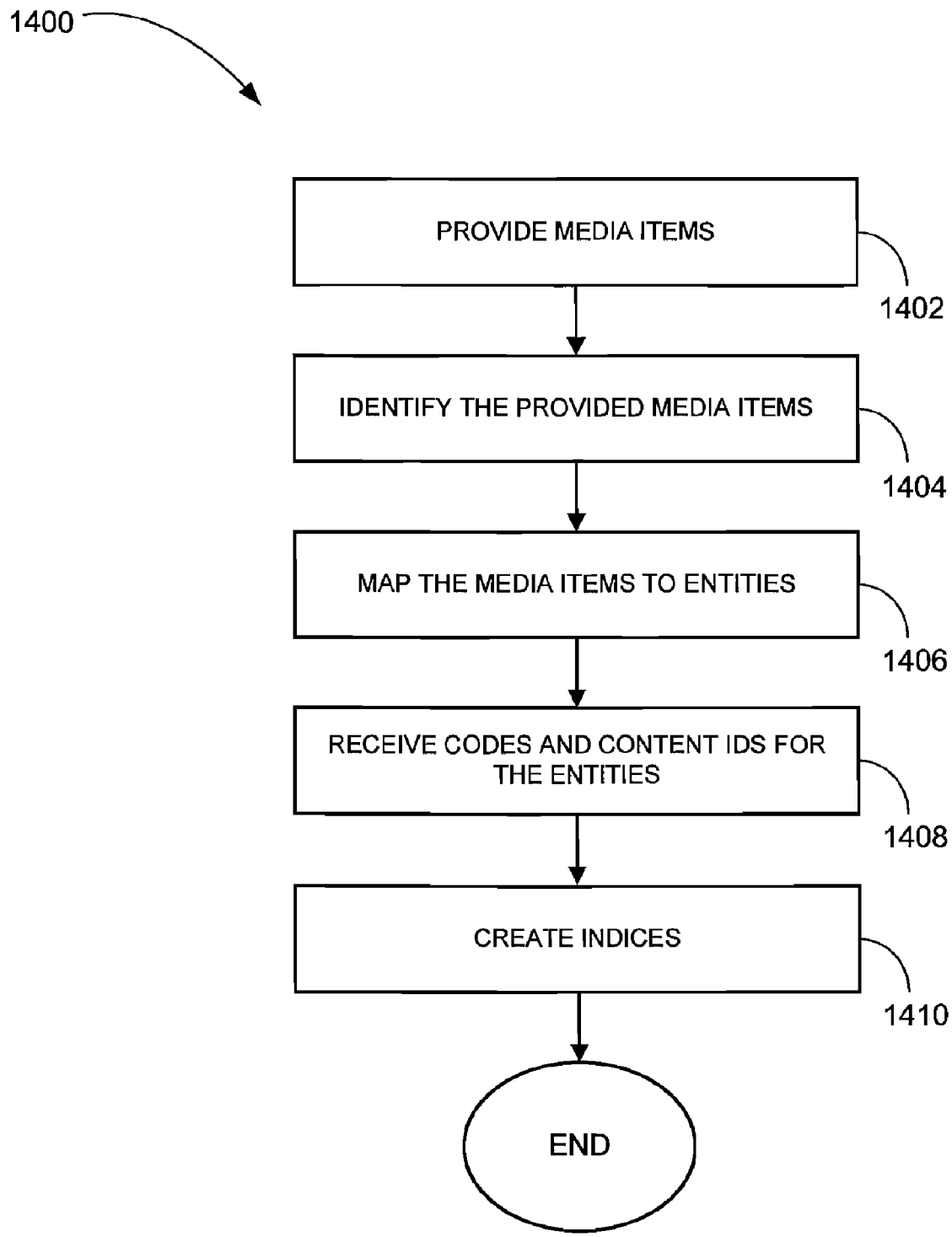
FIG. 14 is a flowchart illustrating a method for coding media items in accordance with an example embodiment.

FIG. 14 illustrates a method 1400 for coding media items according to an example embodiment. The media items 134 may be coded when a media collection is initially provided and/or during a media collection update on the client 102.

Media items may be provided at block 1402. The media items may be loaded and/or transmitted into the client 102. An example embodiment of providing media items is described in greater detail below.

The provided media items may be identified (e.g., through recognition) at block 1404. An example embodiment of recognizing the provided media items is described in greater detail below.

The media items may be mapped to entities at block 1406. An example embodiment of mapping media items to entities is described in greater detail below.

Codes and content IDs may be received for the entities at block 1408. An example embodiment of receiving codes and content IDS is described in greater detail below.

Indices may be created at block 1402. The index may be into a unified data system. The index may physically reside on the client, on another client in a local network, on a remote server, or distributed across more than one client. The indices may be created dynamically based on a client ID a user ID, and/or a combination of one or more parameters indicating a type of indexing that is relevant for a particular user. The indices may optionally indicate which one or more users are associated with a media collection.

Figure 15:
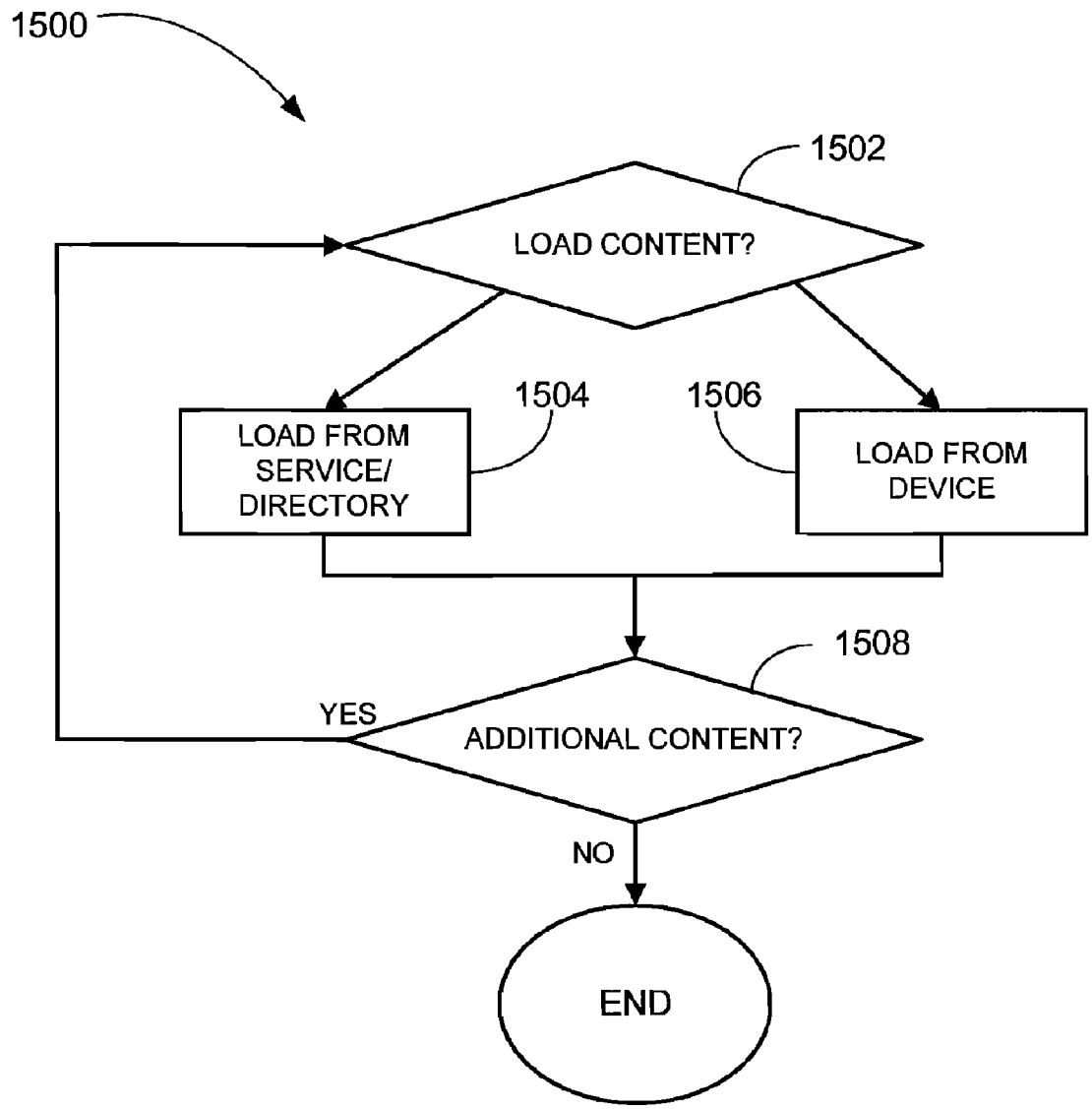
FIG. 15 is a flowchart illustrating a method for loading content from a plurality of sources in accordance with an example embodiment.

FIG. 15 illustrates a method 1500 for loading content from a plurality of sources according to an example embodiment.

A determination may be made at decision block 1502 whether to load content from a service/directory or from a device. The content may include media objects in a variety of forms including audio, video, image, text, and spoken word audio. For example, the formats of the media objects may include WAV, MP3, AAC, WMA, OggVorbis, FLAC, analog audio or video, MPEG2, WMV, QUICKTIME, JPEG, GIF, plaintext, MICROSOFT WORD, and the like.

The content may be loaded from a variety of media including, by way of example, optical media such as audio CD, CD-R, CD-RW, DVD, DVD-R, HD-DVD, Blu-Ray, hard disk drive (HDD) and other magnetic media, solid state media including SD, MEMORY STICK, and flash memory, stream, and other IP or data transport. The content may reside locally or be available through a tether using connections such as LAN, WAN, Wifi, WiMax, cellular networks, or the like.

The media objects may be taken from a variety of objects including an intra-media item segment, a media item (e.g., audio, video, photo, image text, etc.), a program, a channel, a collection, or a playlist.

If a determination is made to load from a service/directory, one or more media items may be loaded from the service/directory at block 1504. The service/directory may include local content, AM/FM/HD radio, satellite radio, Internet on-demand and streaming radio, web page, satellite and cable TV, IPTV, RSS and other web data feeds, and other web services.

If a determination is made to load from a device, one or more media items may be loaded from the device at block 1506. The devices may include, by way of example, a PC, a home media server, an auto stereo, a portable media player, a mobile phone, a PDA, a digital media adapter, a connected CD/DVD/Flash player/changer, a remote control, a connected TV, a connected DVD, in-flight entertainment, or a location based system (e.g., at a club, restaurant, or retail). Other devices may also be used.

Upon completion of the operations at block 1504 and/or 1506, a determination may be made at decision block 1508 as to whether additional media items may be loaded. If additional media items may be loaded, the method 1500 may return to decision block 1502. If no additional media items may be loaded at decision block 1508, the method 1500 may terminate.

Figure 16:
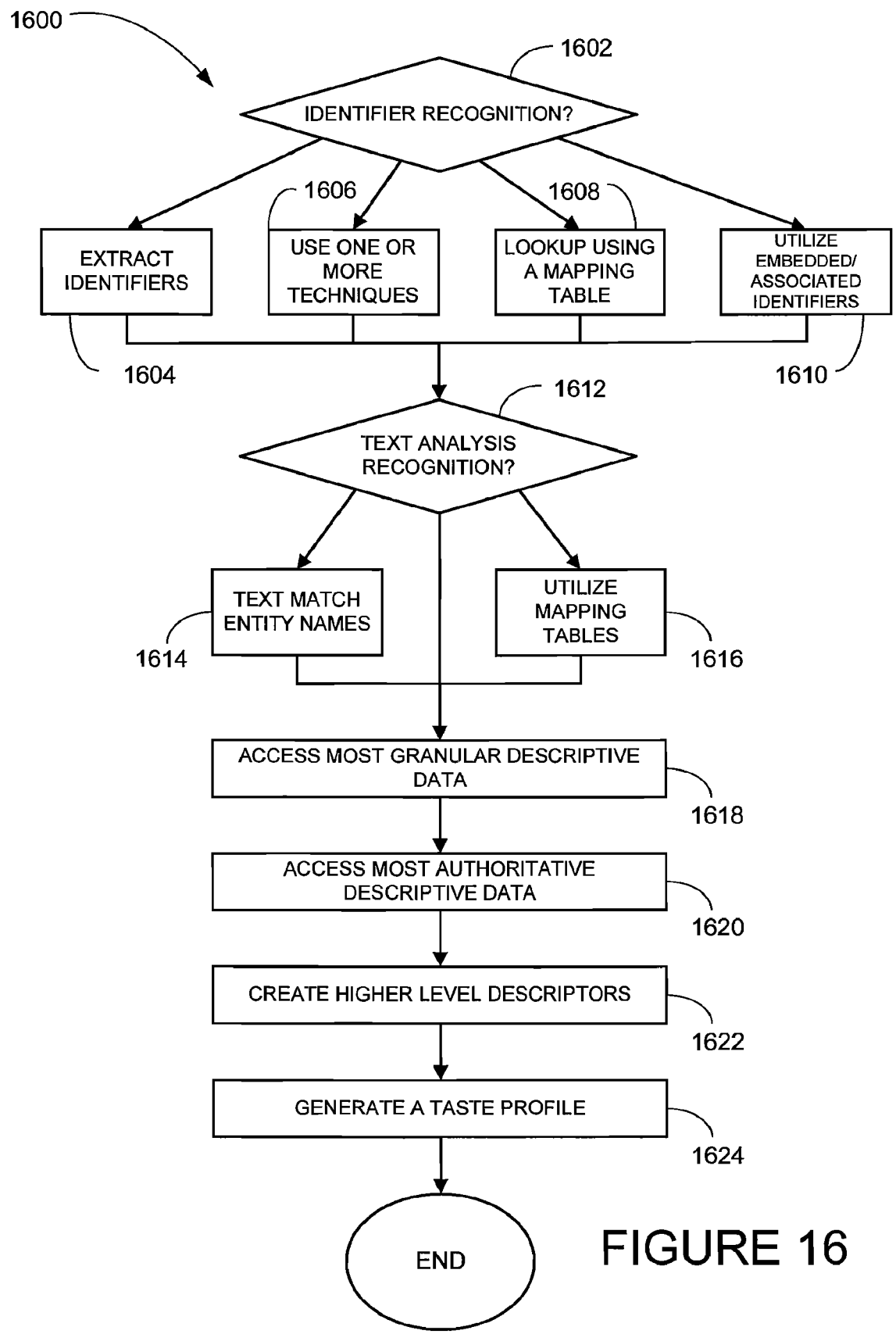
FIG. 16 is a flowchart illustrating a method for content recognition in accordance with an example embodiment.

FIG. 16 illustrates a method 1600 for content recognition according to an example embodiment. In an example embodiment, the method 1600 may be performed at the block 1404 (see FIG. 14).

A determination may be made at decision block 1602 as to how identifier recognition may be performed on content. Identifier recognition may be performed by extracting the identifiers from the content at block 1604, recognizing the content using one or more techniques at block 1606, performing a lookup using a mapping table at block 1608, and/or utilizing an embedded or associated identifier with the content at block 1610.

The identifiers extracted during the operations at block 1604 may include, but are not limited to, TOCs, TOPs, audio file FP, audio stream FP, digital file/file system data (e.g., file tags, file names, folder names, etc.), image FP, voice FP, embedded entity IDs, embedded descriptor IDs, and a metadata data stream.

The one or more techniques used for recognizing the content at block 1606 may include optical media identifiers (e.g., TOCs or TOPs), digital file/stream identifiers (e.g., audio file FP, audio stream FP, or metadata data stream), digital file and digital system data (e.g., file tags, file names, or folder names), image recognition, voice/speech recognition, video FP recognition, text analysis, melody/humming recognition, and the like.

An example of a digital fingerprint technique that may be used during the operations at block 1606 to identify digital content is robust hashing. For example in mono audio, a single signal may be sampled. If the audio is stereo, either hash signals may be extracted for the left and the right channels separately, or the left and the right channel are added prior to hash signal extraction. A short piece or segment of audio (e.g., of the order of seconds), may be used to perform the analysis. As audio can be seen as an endless stream of audio-samples, audio signals of an audio track may be divided into time intervals or frames to calculate a hash word for every frame. However, any known technique that may used to identify content from a segment or portion of content (e.g., the actual audio content or video content) may be also used. Thus, in an example embodiment, the content may be identified independent of any watermark, tag or other identifier but rather from the actual content data (actual video data or actual audio data).

The embedded and/or associated identifiers that may be used in performing a lookup using a mapping table at block 1608 may include a UPC, an ISRC, an ISWC, a GRID/MI3P/DDEX, a third party ID, a SKU number, a watermark, HiMAT, MPV, and the like.

Upon completion of the operations at block 1604, block 1606, 1608, and/or 1610, a determination may be made at decision block 1612 whether to perform text analysis recognition. If a determination is made to perform text analysis recognition, a text match of entity names may be performed at block 1614 and/or mapping tables may be utilized at block 1616.

The text match of entity names to a more normalized entity ID at block 1614 may include artist name, album name, alternate spellings, abbreviations, misspellings, and the like. The mapping tables may be utilized at block 1616 to map available textual descriptors from an available entity (e.g., album, artist, or track) to a normalized descriptor ID. The available textual descriptors may include a genre name text, a mood name text, a situation name text, and the like.

If text analysis recognition is not to be performed or upon completion of the operations at block 1614 and/or block 1616, the most granular descriptive data may be accessed at block 1618. The most granular descriptive data may be embedded in a media item and/or may be retrieved from the database of descriptors associated with the identifier.

The most authoritative descriptive data may be accessed at block 1620. The most authoritative descriptive data may be embedded in a media item and/or may be retrieved from the database of descriptors associated with the identifier.

Higher level descriptors may optionally be created at block 1622. The higher level descriptors may be created by extracting features, and classifying and creating one or more mid-level or high-level descriptors.

A taste profile may optionally be generated at block 1624. The taste profile may be generated by summarizing the media collection and using the summary to generate the taste profile (e.g., a preference of a user of the client 102).

Figure 17:
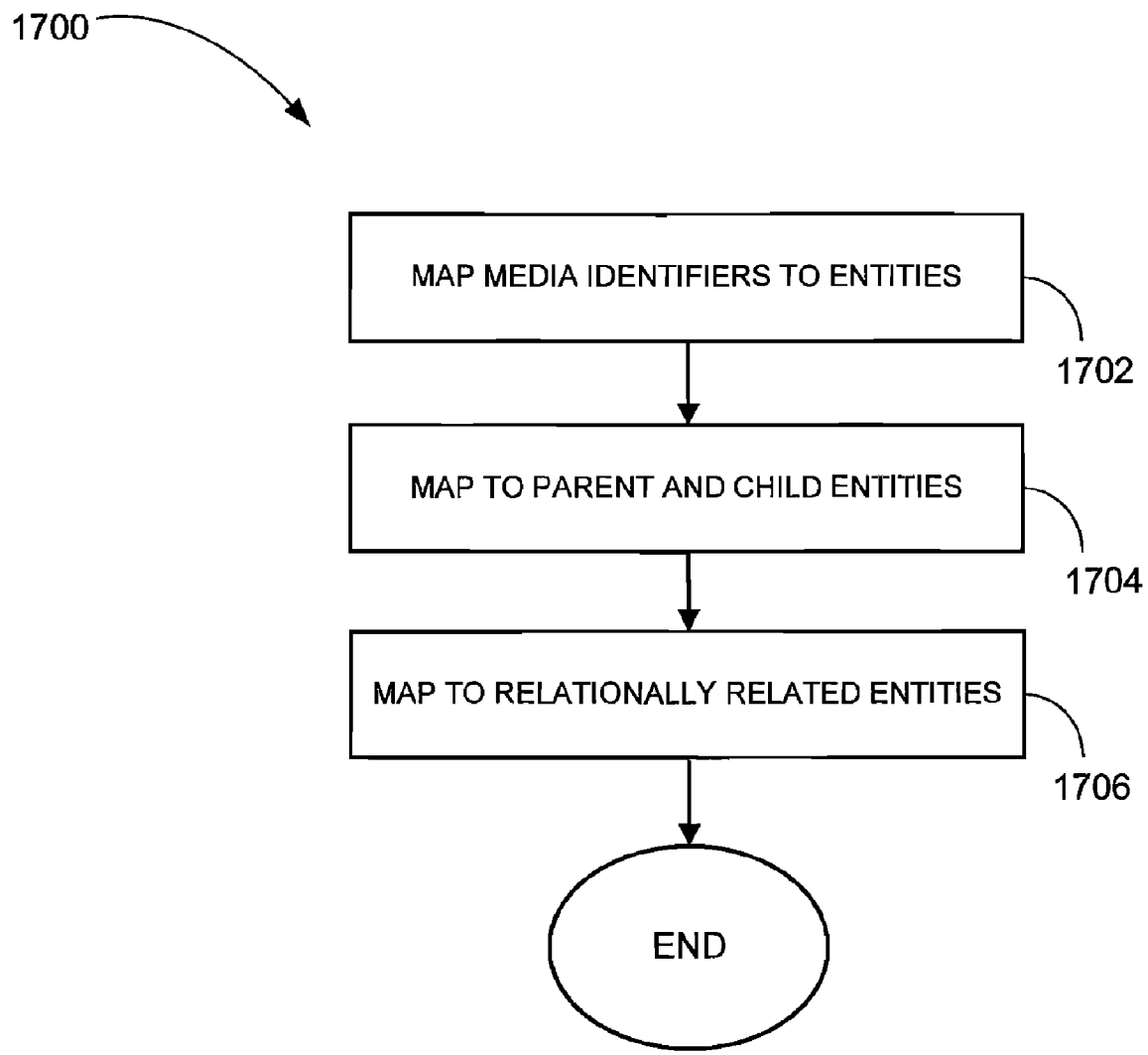
FIG. 17 is a flowchart illustrating a method for mapping content IDs in accordance with an example embodiment.

FIG. 17 illustrates a method 1700 for mapping content IDs according to an example embodiment. In an example embodiment, the method 1700 may be performed at block 1406 (see FIG. 14).

Media identifiers may be mapped to entities at block 1702. The media identifiers may optionally be mapped to normalized, semantically meaningfully core entities. The media identifiers that may be mapped include, but are not limited to, a lyric ID, a composition ID, a recording ID, a track ID, a disc ID, a release ID, an edition ID, an album ID, a series ID, a recording artist ID, a composer ID, a playlist ID, a film/TV episode ID, a photo ID, or a text work ID.

Parent and child entities may be mapped at block 1704. The mapping may be a local map to hierarchically-related semantically meaningful entities. Example of mappings between parent and child entities may include mapping between a composition ID, a recording ID, and a track ID; a lyric ID, a recording ID, and a track ID; a lyric ID, a composition ID, and a track ID; a lyric ID, a composition ID, and a recording ID; a track ID, a release ID, an edition ID, an album ID, and a series ID; a track ID, a disc ID, an edition ID, an album ID, and a series ID; a track ID, a disc ID, a release ID, an album ID, and a series ID; a track ID, a disc ID, a release ID, an edition ID, and a series ID; and a track ID, a disc ID, a release ID, an edition ID, and an album ID. Other mappings may also be used.

Relationally related entities may be mapped at block 1706. For example, segments may be mapped. An example of a map for relationally related entities includes a map between disc ID, release ID, edition ID, album ID, and series ID.

Figure 18:
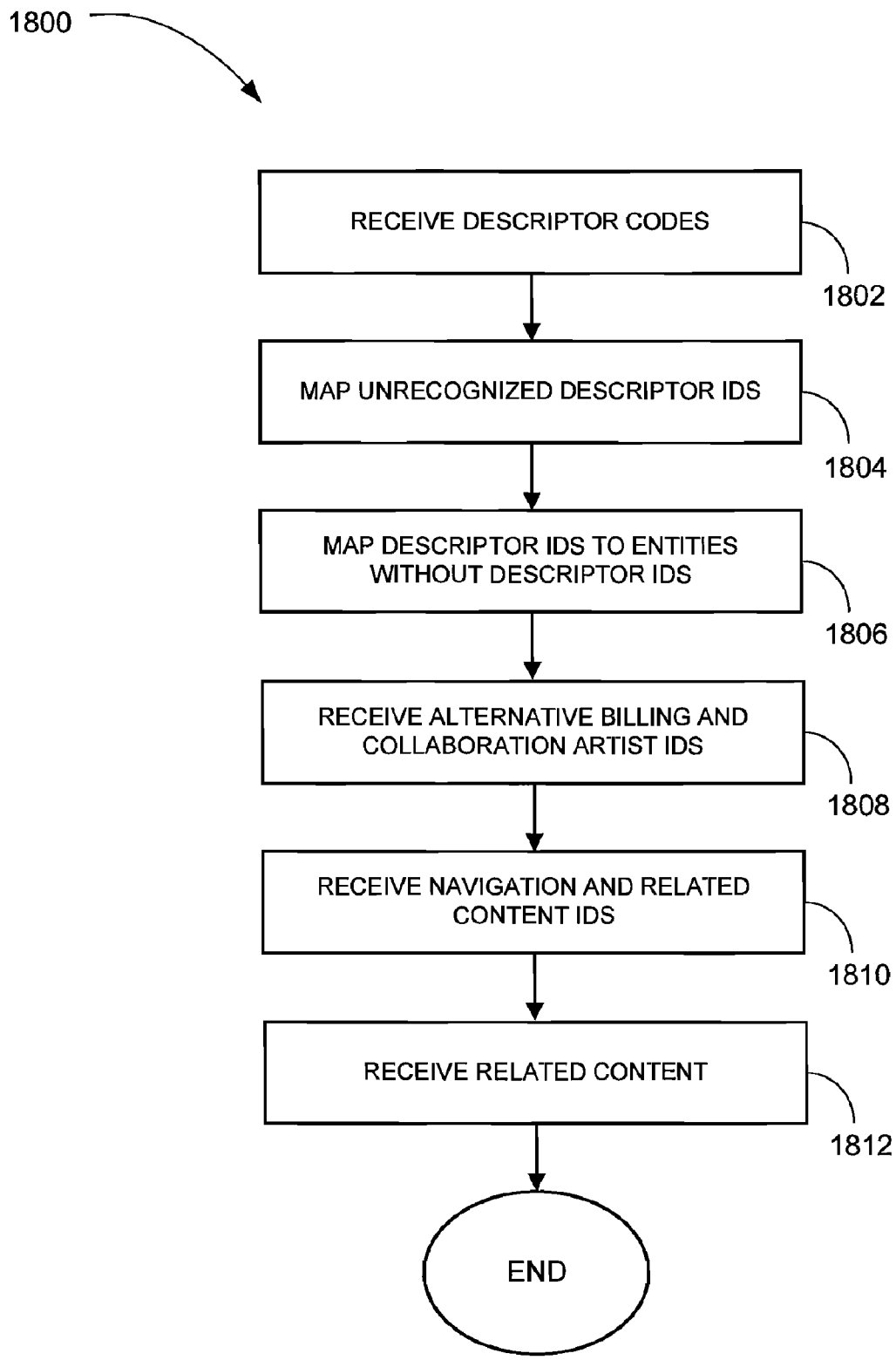
FIG. 18 is a flowchart illustrating a method for receiving master descriptor codes and content IDs for content in accordance with an example embodiment.

FIG. 18 illustrates a method 1800 for receiving master descriptor codes and content IDS for content according to an example embodiment. In an example embodiment, the method 1800 may be performed at block 1408 (see FIG. 14).

Descriptor codes may be received for the entities of the content at block 1802. The retrieved descriptor codes may be for granular ordered or weighted factual and descriptive codes. The descriptor codes may be received from one or a plurality of sources locally and/or over a network.

Unrecognized descriptor IDs may be optionally mapped at block 1804. The mapping may translate the unrecognized descriptor code into a normalized descriptor code. Examples of maps that may be used to map the descriptor IDs include a genre map, an origin map, a recording era map, a composition era map, a mood map, a tempo map, and a situation map.

Descriptor IDs may optionally be mapped to entities without descriptor IDs at block 1806. For example, when a descriptor has not been mapped to parent and child entities via cascading prior to retrieval, a local mapping to an entities without a direct descriptor ID may be performed after retrieval of a parent or child descriptor ID.

Alternative billings and collaboration artist IDs may be received at block 1806. Mappings of alternative billing IDs to primary artist IDs and mappings of collaborations to component individual contributors may be received.

Navigational and related content IDs may be received at block 1808. Navigational and related content IDs may include, by way of example, cover art, an artist photo, an artist bio, an album review, a track review, a label logo, a track audio preview, a track audio, a palette, or phonetic data.

Related content may be received at block 1810. Related content may be received by using a related content ID to request delivery of/or unlocking of related content from local and/or remote sources (e.g., a store)

Figure 19:
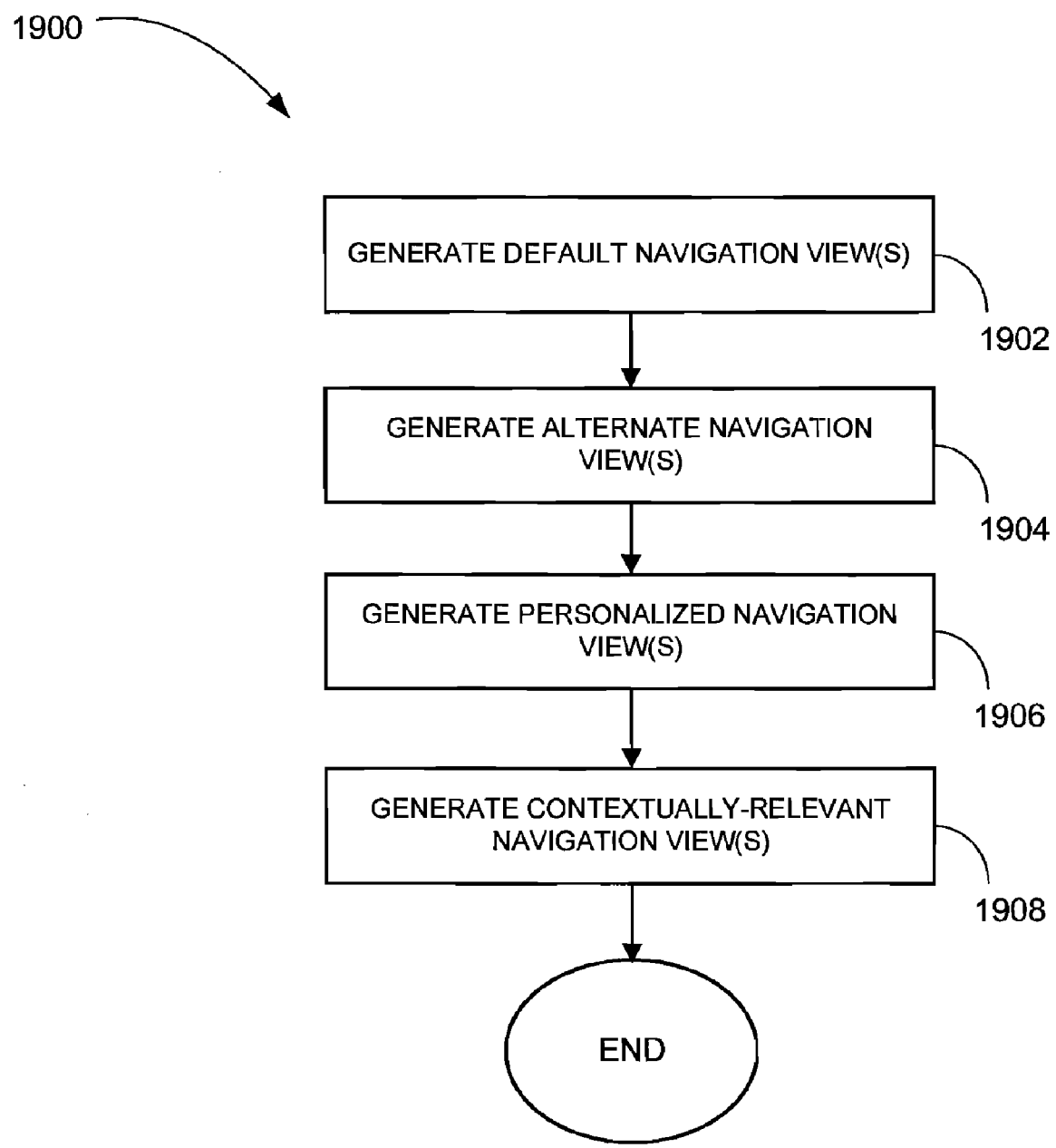
FIG. 19 is a flowchart illustrating a method for utilizing a navigation package in a client in accordance with an example embodiment.

FIG. 19 illustrates a method 1900 for utilizing a navigation package in a client 102 (see FIG. 1) according to an example embodiment. One or more default navigation views may be generated at block 1902. One or more alternate navigation views may be generated at block 1904. One or more personalized navigation views may be generated at block 1906. One or more contextually relevant views may be generated at block 1908. An example embodiment for creating the views that may be generating during the operations of the method 1900 is described in greater detail below.

Figure 20:
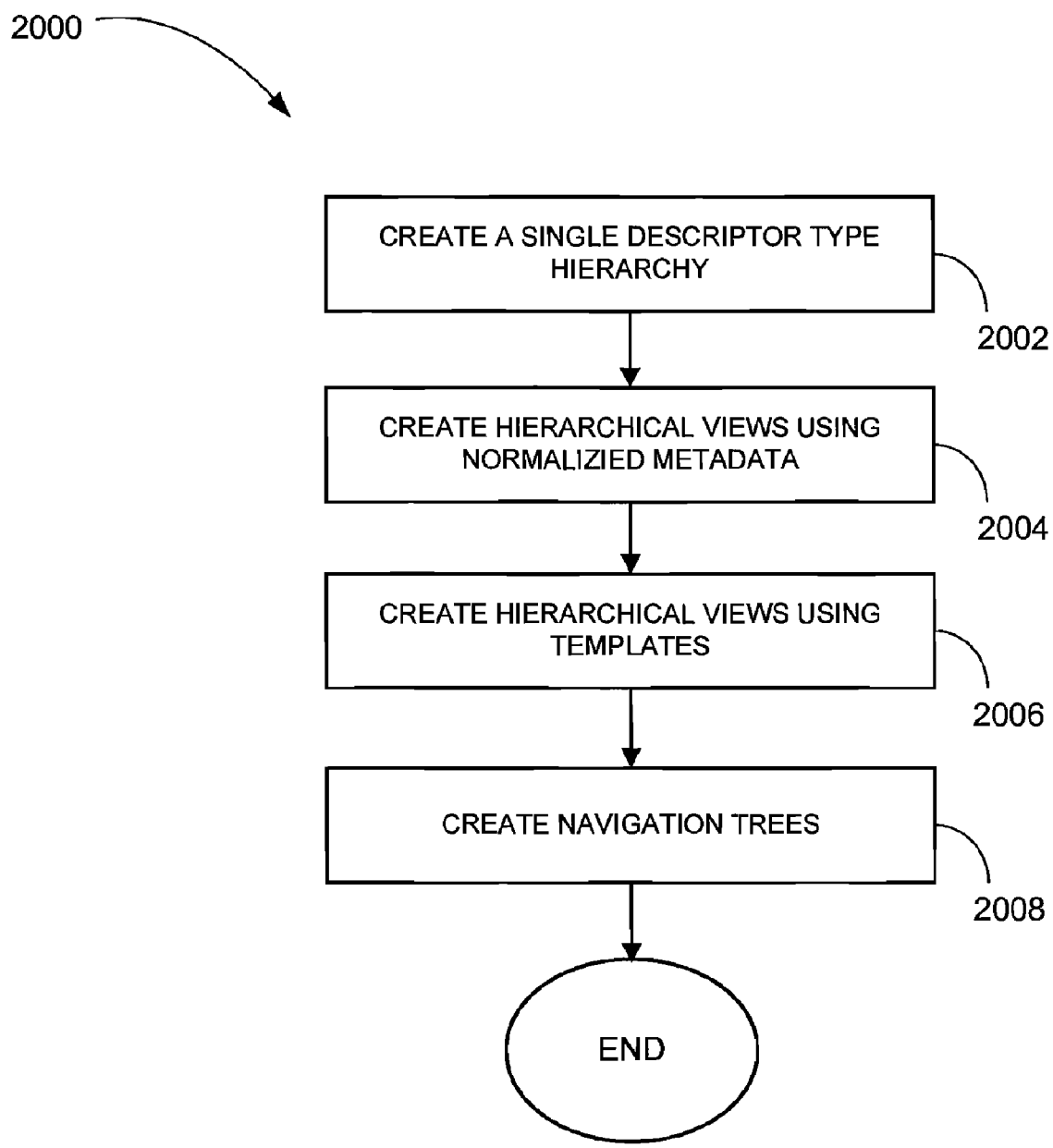
FIG. 20 is a flowchart illustrating a method for creating a navigational view in accordance with an example embodiment.

FIG. 20 illustrates a method 2000 for creating a navigational view according to an example embodiment. In an example embodiment, the method 2000 may be performed at block 1902, block 1904, block 1906, and/or block 1908.

A single descriptor type hierarchy 116 may be created at block 2002. Default templates may be used to organize media items into one or more single descriptor type hierarchies that may optionally be normalized (e.g., normalized single descriptor type hierarchy). Options for the single descriptor type hierarchy may include a number of levels, an average number of categories under each note at each level, and/or the entity type contained in the lowest level categories (e.g., track, artist, album, or composition).

Example of single descriptor type hierarchies 116 include meta-genre /genre/sub-genre:track, meta-mood/mood/sub-mood:track, meta-origin /origin/sub-origin:track, meta-era/era/sub-era:track, meta-type/type/sub-type: track, meta-tempo/tempo/sub-tempo:track, meta-theme/theme/sub-theme:track, meta-situation/situation/sub-situation:track, and meta-work type/work type/sub-work type:track. Each of the single descriptor hierarchies may optionally be identified with a unique identifier.

Hierarchical views may be created using normalized metadata at block 2004. The normalized metadata from recognition may be used to organize media items into summarized, normalized single-entity hierarchical views. The hierarchical views may be a single level or multiple levels. For example, a main artist may be displayed at a top level and an alternate billing level may be displayed when applicable.

By way of example, the hierarchical views may include recording artist:track, composer:track, album:track, recording:track, and composition:track.

Hierarchical views may be created using existing metadata and/or entity hierarchies from templates at block 2006. The existing metadata and/or entity hierarchies from the navigation templates 300 may be used to organize media items into summarized, normalized single-entity hierarchical views. For example the views may include artist/album:track or composer/composition:recording. Other views may also be created.

Navigation trees 314 may be created at block 2008. The default navigation template 300 may be used to organize media items into one or more navigation trees 314. The navigation trees 314 may optionally be normalized and may include a unique identifier for subsequent identification.

A particular navigation tree 314 may be defined by a number of levels of the tree, the container (e.g., a descriptor category or entity type) used at each level of the tree, and a number of categories for each category level of the tree (e.g. which category list is used for the levels using category lists), the entity type or types that are ultimately organized by the categories of the tree at the lowest level or alternatively the navigation tree may consistent only of levels of descriptors. The particular navigation tree 314 may be further defined by the mappings from the master descriptor list to the category lists and the mappings from each category list to the other category lists.

Examples of navigation trees 314 may include genre/era: track, genre/mood/tempo:recording, artist/mood/year:track, genre/year:news article, genre/origin, and the like.

Figure 21:
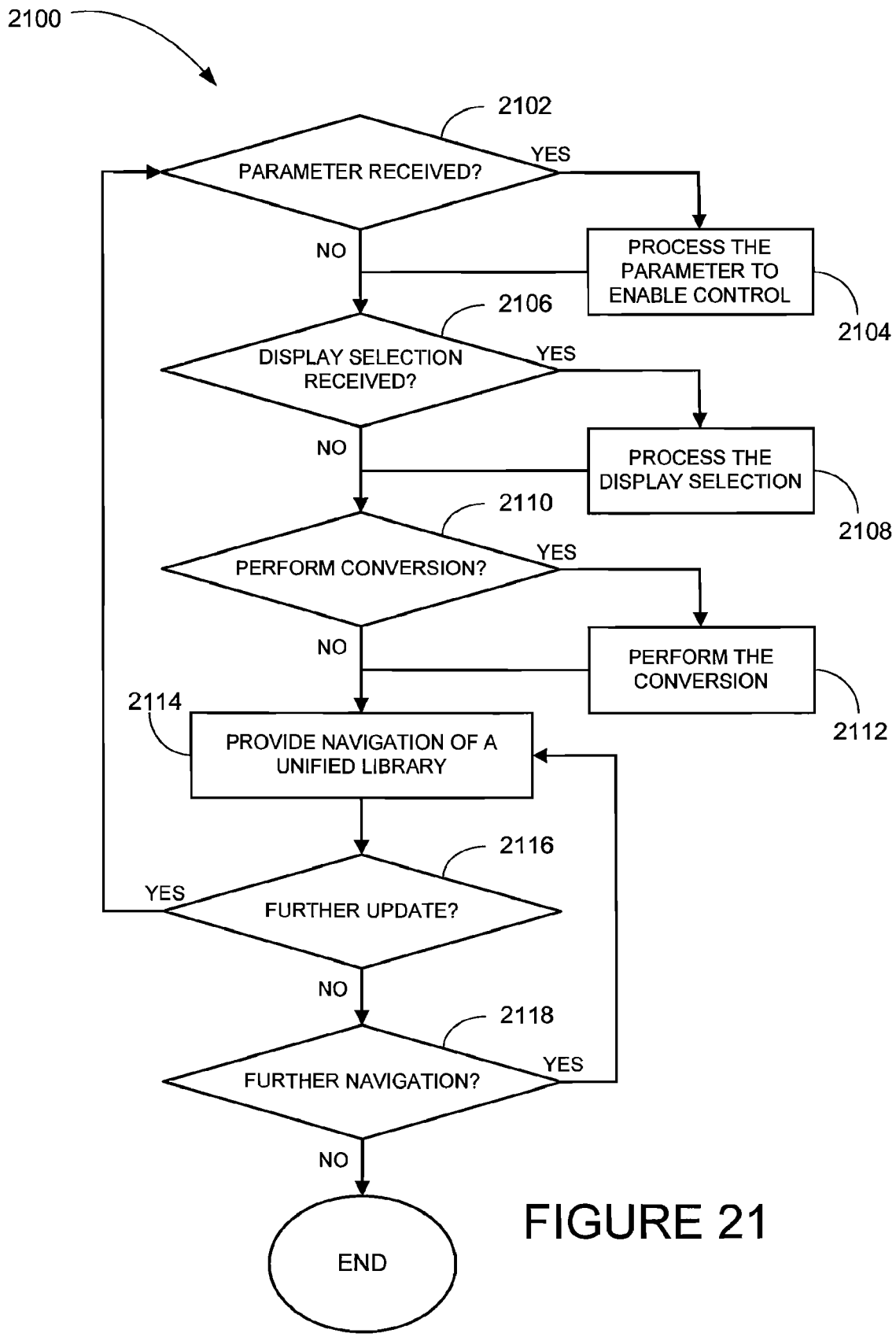
FIG. 21 is a flowchart illustrating a method for updating navigational views in accordance with an example embodiment.

FIG. 21 illustrates a method 2100 for updating navigational views according to an example embodiment. In an example embodiment, the navigational views generating during the method 2000 (see FIG. 20) may be update.

A determination may be made at decision block 2102 whether a parameter was received. If a determination is made that the parameter was received, the parameter may be processed to enable control at block 2104. The parameter may be received to allow for control over a category list and entity item ordering at each level. For example, the ordering options of the API input may include alpha-numerical, date/time, number of sub-categories, number of items in container, editorial semantic relationship B (e.g., similarity clustering), editorial semantic relationship B (e.g., liner sequence closest fit), editorial: importance or quality, popularity (e.g., may be static or dynamically generated), custom, and the like. If a determination is made that the parameter was not received at decision block 2102, the method 2100 may proceed to decision block 2106.

At decision block 2106, a determination may be made as to whether a display selection has been received. If a determination is made that the display selection has been received, the display selection may be processed at block 2108. The display selection may specify (e.g., through an API of the client 102) whether to display metadata as is being from a media item or alternatively display a higher-level category item label from a selected hierarchy category list for a descriptor/category field. The display selection may optionally be used to override parameters inherited from a global profile for a device or application. If a determination is made that the display selection has not been received at decision block 2106, the method 2100 may proceed to decision block 2110.

A determination may be made at decision block 2110 whether to perform a conversion. If a determination is made to perform a conversion (e.g., based on instructions received through the API), the conversion may be preformed at block 2112. The conversion may be to convert text into alternate forms of presentation (e.g., TLS) for a name/label field. If a determination is made not to perform the conversion at decision block 2110, the method 2100 may proceed to block 2114.

The unified library of media items may be navigated at block 2114. The unified library may include the media items 134 available from the plurality of media sources 106.1-106.n. The unified library may be navigated from the client 102 and optionally another client on the network.

At decision block 2116, a determination may be made whether to modify the navigation. If a determination is made to modify the navigation, the method 2100 may return to decision block 2102. If a determination is made not modify the navigation at decision block 2116, the method 210 may proceed to decision block 2118.

A determination may be made at decision block 2118 whether to further navigate the unified library of media items. If a determination is made to further navigate the unified library, the method 2100 may return to block 2114. If a determination is made not to further navigate the unified library, the method 2100 may terminate.

Figure 22:
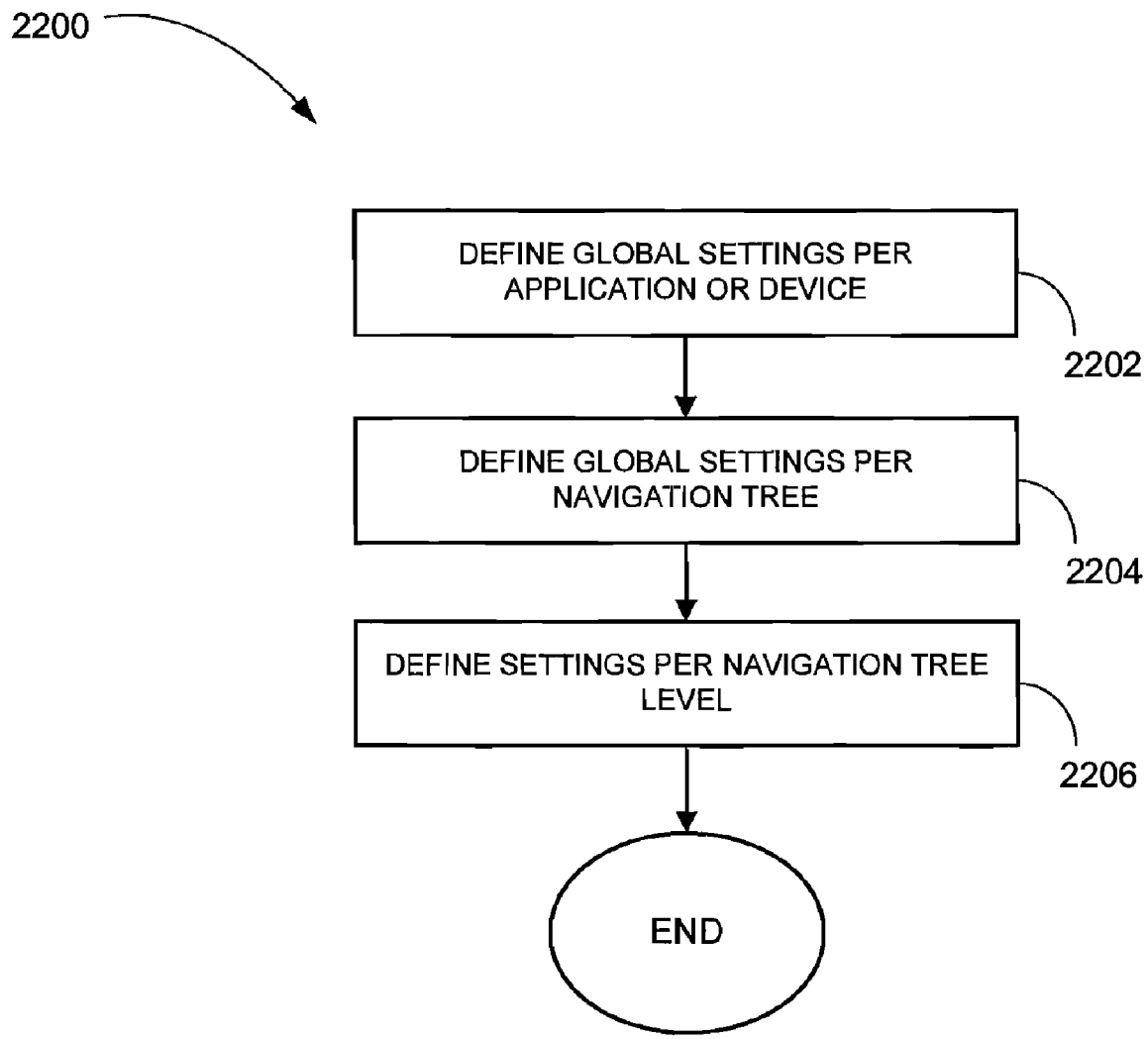
FIG. 22 is a flowchart illustrating a method for presenting a navigation view on a client in accordance with an example embodiment.

FIG. 22 illustrates a method 2200 for presenting a navigation view on a client 102 (see FIG. 1) according to an example embodiment. The method 2200 may be used to enable multiple descriptor hierarchies 116 to be available in a single client (e.g., a device and/or application). The multiple hierarchies 116 may be built from the same master descriptor code. For example, both a gender-oriented and group-type oriented view of artist type master descriptor codes and both a recording-era oriented and a classical composition oriented view of era master descriptor codes may be presented.

Global settings may be defined per client 102 at block 2202 and per navigation tree at block 2204. Settings may also be defined per navigation tree level at block 2206.

Examples of settings that may be defined during the operation of the method 2200 is as follows:

Define Settings Per Navigation Tree Level
- I. Define Navigation Tree Levels: Descriptor Levels
  - System
  - Hierarchy
  - Category List
- II. Define Navigation Tree Levels: Entity Levels
  - Entity Type
  - Hierarchy
  - Category List
- III. Navigation Tree Item Inclusion Options API Input (e.g., to what is a specific tree providing access)
  - Select Object Type(s) to be Included
  - Select Service(s) to be Included
  - Select Format(s) to be Included
  - Select Media(s) to be Included
  - Select Devices(s) to be Included
  - Select Descriptor Value(s) associated with Specific Entity Level to be Included
  - Select Most Granular Entities to Be included
- IV. Entity Item Categorization Options API Input
  - Display Entity Item only under Primary Category that is coded to it or display under all Categories that are coded to it
  - Display Category and Entity Item if Applicable Descriptor is Coded to Which Entity Item Level(s)

Parameters Input to the API Allow for the Control Over Whether Category Display
- V. Category Display Options API Input (yes/no)
  - Display "All Other/General" Child Categories
  - Display child Category When only a single Child Category Exists
  - Move child Category Label\to Parent level when only a single Child Category
  - Display Child Category only under Primary Parent, or display under all Parents
  - Skip Identical Categories at Adjacent Levels
  - Display Empty Categories
- VI. Category Name Display API Input
  - Language
  - Use Short Terms
  - Use Alternate Labels
- VII. Entity List Grouping API options
  - In Artist List, Group Artists appearing on Various Recording Artist compilations under single Category
  - In Artist List, do not list Artists appearing on Various Recording Artist compilations separately
  - In Composer List, Group Composers appearing on Various Composer compilations under single Category
  - In Composer List, do not list Composers appearing on Various Composer compilations separately
  - In Artist List, Group Artists with only a single track under single Category
  - In Artist List, Alternate Billings of Artist Name all Under Main Artist Name
  - In Artist List, List all Alternate Billings of Artist Name Separately
  - In Artist List, List all Alternate Billings of Artist Name Separately, and under Main Artist
  - For Collaborations, List only the Collaboration Name
  - For Collaborations, List the Collaboration name and the Primary Artist Name
  - For collaborations, List the Collaboration Name, Primary Artist Name and Secondary Artist Name
  - In Album List, group single-artist Collection/Anthology compilations under a single category
- VIII. Item Name Profanity Filter Options API Input
  - Remove Item from Item List
  - Display with Flagged word(s) obscured
  - Display with all but first letter of flagged word(s) obscured
  - Display all Flagged words, but flag
  - No special Treatment
- IX. Entity List Duplicate Item Handling
  - Flag duplicates based on Fingerprint
  - Flag duplicates based on TOC
  - Flag duplicates based on Filename
  - Flag duplicates based on Track Name+Artist Name\
  - Flag duplicates based on Track Name+Artist Name+Album Name
  - Flag duplicates based on File Hash
  - For each duplicate:
    - Display both, but flag
    - Display only one
- X. Item Name List Display Options API Input
  - Display Short Names
  - Display First, Last
  - Display First, Last
  - Display "Name, The"
  - Display "The Name"
- XI. Detail Item Display
  - Only Display Movement Name in Track Field for TLS Classical
  - Display Composer Name Last in Track for TLS Classical
  - Do not Display Soloist in Artist Field for TLS Classical
  - Display Short Names
  - Display First, Last
  - Display First, Last
  - Display "Name, The"
  - Display "The Name"

Parameters Input to the API Allow for the Control Over Category List Ordering at the Levels
- XII. Category Name Ordering Options API Input (options may be selected for a sort number (e.g., first and second sort) and ascending/descending)
  - Alpha-Numerical
  - Date/Time
  - Number of Sub-Categories
  - Number of Items in Container
  - Duration of Items in Container
  - Editorial Semantic Relationship B: (e.g. similarity clustering)
  - Editorial Semantic Relationship B: (e.g. Linear sequence closest fit)
  - Editorial: Importance or Quality
  - Popularity (may be dynamically generated)
  - Custom—Developer
  - Custom—End-User
  - Order based on other descriptor of Category Parameters Input to the API Allow for the Control Over Entity Item Ordering at Each Level
- XIII. Item Ordering Options API Input (options may be selected for a sort number (e.g., first and second sort) and ascending/descending)
  - Alpha-Numerical (based on as-displayed, First Last Option, Preceding Article Option)

Figure 23:
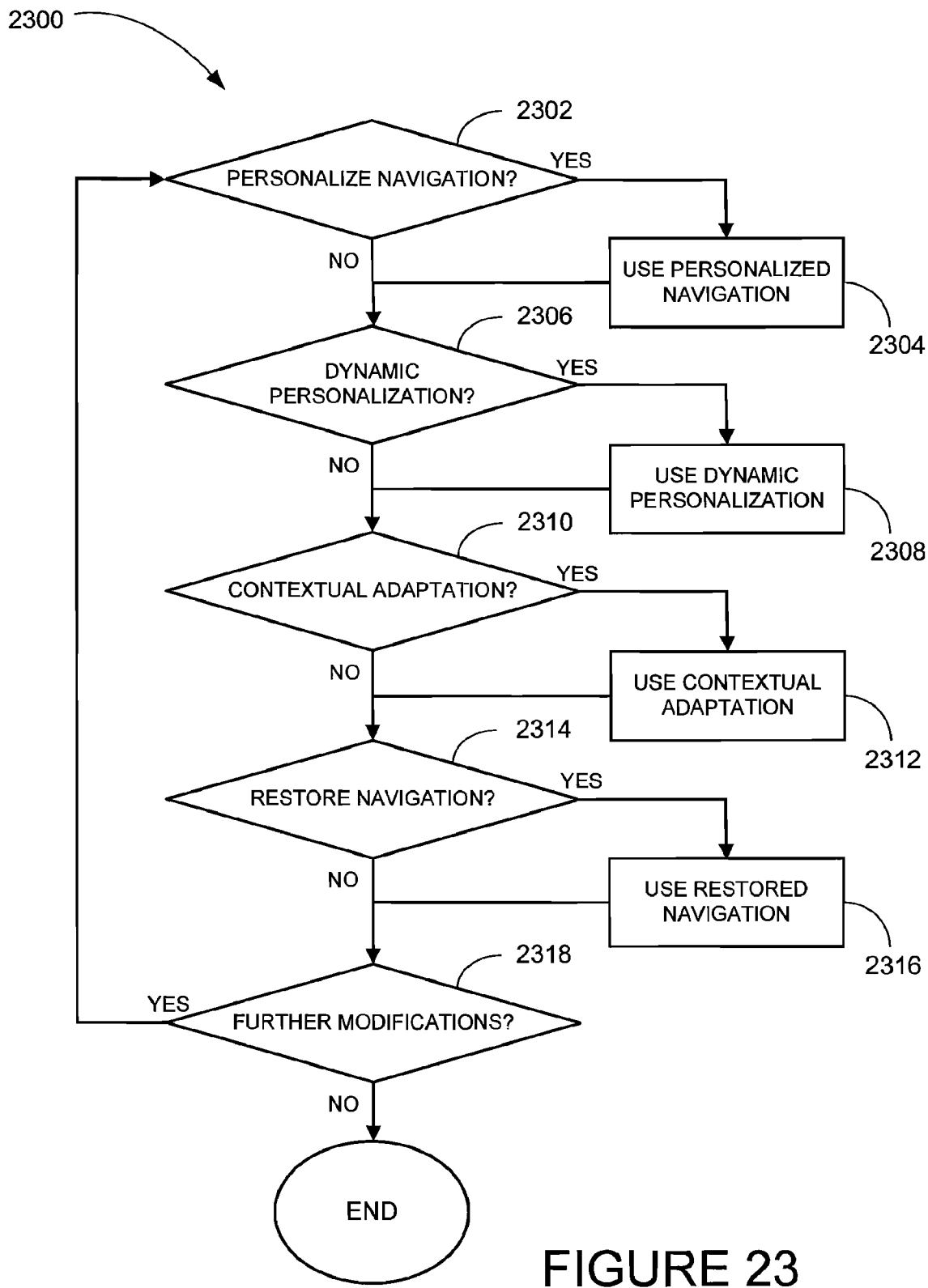
FIG. 23 is a flowchart illustrating a method for altering navigation on a client in accordance with an example embodiment.

Flags (e.g. Release Type: Album, Single, Collection)
Chronological
Popularity (Can be dynamically generated)
Custom
Order based on other descriptor/attribute of Entity XIV. Navigational content Items to Display API Input—
Navigational content items can be dynamic by being updated in real-time or by periodic updates upon connection with a server (yes/no)
Album Cover Art
Artist Photo
Genre Icon
Era Icon
Origin Icon/Flag
Venue Logo
Time Cycle Icon
Mood Icon
Custom
Tempo Icon
Instrument Icon
Situation Icon
Theme Icon
Video Still
Moving Thumbnail
Thumbnail Sequence
Descriptor/Entity Type Icon
Audio Description of Category, Entity Item
Custom FIG. 23 illustrates a method 2300 for altering navigation on a client 102 (see FIG. 1) according to an example embodiment.

A determination may be made at decision block 2302 whether to use personalized navigation. If a determination is made to use personalized navigation, personalized navigation may be used at block 2304.

Navigation may be personalized by providing tools for user tagging and to adapt tagging menus based on a profile. End-users may be able to personalize by manually overriding category names, entity item names, and category groupings.

Navigation may also be personalized by dynamic configuration of hierarchies 116 based on collection and/or user profile. An end-user may also manually select and/or construct a hierarchy 114 to be used for navigation. Content may be flagged and/or tagged by the user at the client 102 level and/or file level.

Preferences may be stored remotely to be retrieved by a difference client (e.g., application or device) of the user and/or may be transferred directly from one client to another via a wired or wireless connection.

If a determination is made not to use personalized navigation at decision block 2302, the method 2300 may proceed to decision block 2306.

At decision block 2306, a determination may be whether to use dynamic personalization. If a determination is made to use dynamic personalization, dynamic personalization may be used at block 2308.

Assembled personal profile data may be accessed automatically to provide dynamic personalized navigation. An implicit profile may be overridden with any explicit input provided by the user. Sources used for dynamic personalization may include explicit input, an index of user media collection including counts of media items per entities and per categories, or an activity log that logs user activity to track activity across a current device or multiple devices of a user to an activity and consists of plays, clicks, time engages, and/or other factors.

The output of the dynamic personalization may be a combined profile. The profile may indicate a relative level of interest/importance of category or entity item to the end-user and may be stored remotely and/or locally.

An alternative navigational tree 314 may be dynamically constructed based on profile input. A determination may be made as to how many levels to step up or down for sub-sections of the list in order to re-tune. An example of the alternative navigation tree 314 dynamically constructed is as follows:

A standard view may present a U.S. default 25-Item Genre Category List at Top level;

A customized 25-item list view may be presented instead by looking at the next higher level in the hierarchy specified by the template (e.g., a 6-item list). The profile may indicate that "rock" is the user's most preferred genre of those listed at the higher level.

The new 25-Item list may then be generated as follows: First, the remaining categories (e.g., 5 categories) from the higher list (e.g., 6 items) are used to cover all music other than Rock. This leaves twenty rock categories to be populated. These are taken by identifying the 19 most preferred categories from the rock section of the next lower level in the hierarchy (which, say, includes 30 Rock Categories), each of which is listed. The main category labelled "more rock" may contain all of the remaining rock categories from the next lower level.

The next level down under the "More Rock" category may either show the remaining 9 rock categories from the next lower level, or just show a single list of all sub-categories that would normally be displayed at that level.

Composite graphical, audio, video or textual navigational icons may be dynamically selected for personalization based on current contents of the container.

If a determination is made not to use personalized navigation at decision block 2306, the method 2300 may proceed to decision block 2310.

A determination may be made at decision block 2310 whether to use contextual adaptation. If a determination is made to use contextual adaptation, contextual adaptation may be used at block 2312.

Contextual adaptation may use real-time global textual adaptation and/or real-time personal contextual adaptation. The data may be accessible by a client 102 either locally or remotely.

Examples of real-time global contextual adaptation include use of location (GPS, cell), time of day, week, season, year, date, holidays, weather, acceleration, speed, temperature, orientation, object presence (using technologies like RFID, BLUETOOTH), and public personal presence. Examples of real-time personal contextual adaptation include use of personal location bookmarks (using data provided by GPS or cellular networks), personal time of day, week, year preference, birthdays, anniversaries, weather preference, personal tagged object presence, known tagged personal presence, heart rate, and other bio data feeds.

If a determination is made not to use contextual adaptation at decision block 2310, the method 2300 may proceed to decision block 2314.

At decision block 2314, a determination may be whether to restore navigation. If a determination is made to restore navigation, navigation may be restored at block 2316.

If a determination is made not to restore navigation at decision block 2314, the method 2300 may proceed to decision block 2318.

A determination may be made at decision block 2318 whether to make further modifications. If a determination is made to make further modifications, the method 2300 may return to decision block 2302. If a determination is made not to make further modification, the method 2300 may terminate.

Figure 24:
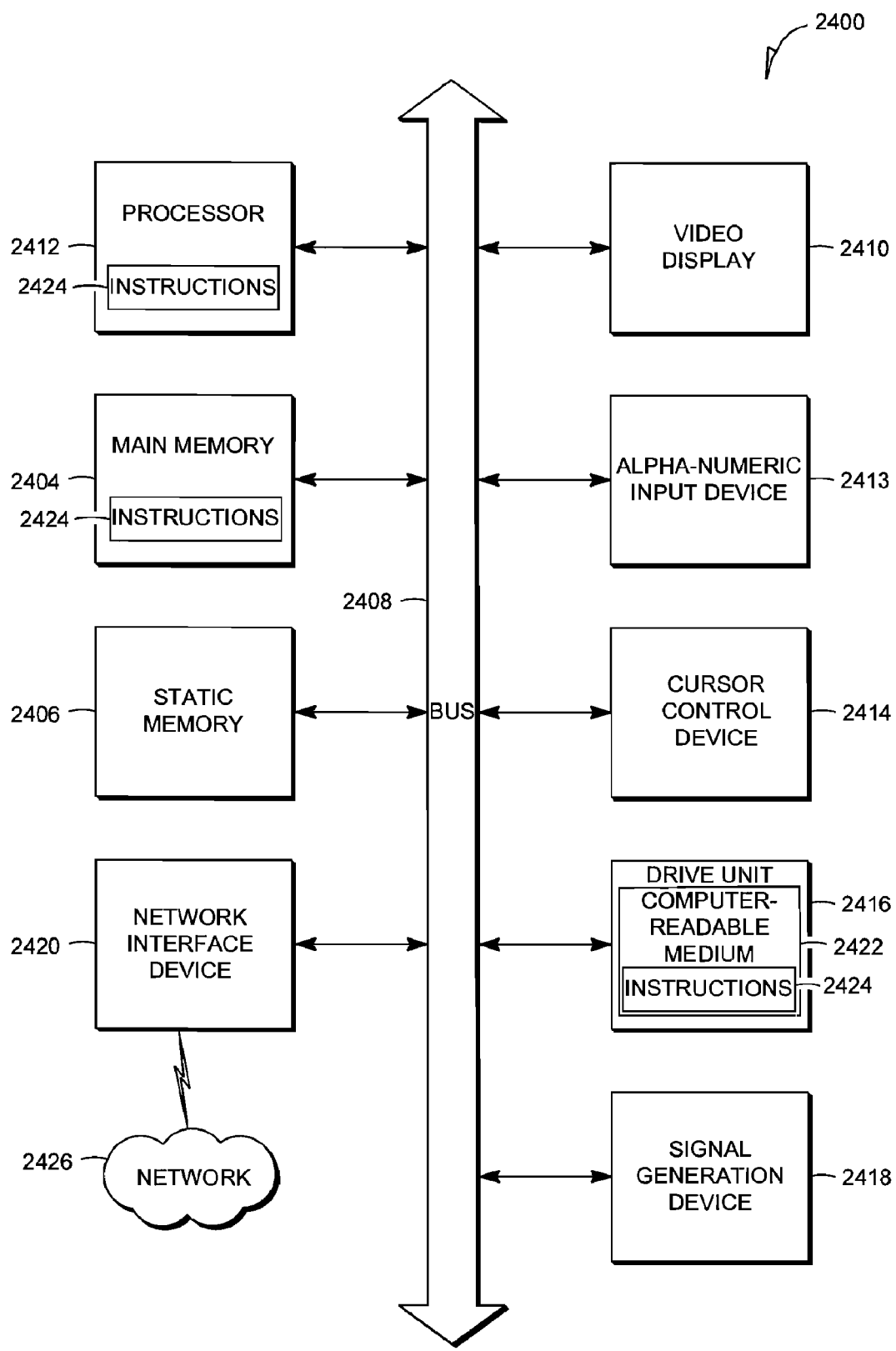
FIG. 24 illustrates a diagrammatic representation of machine in the example form of a computer system within which a set of instructions, for causing the machine to perform any one or more of the methodologies discussed herein, may be executed.

FIG. 24 shows a diagrammatic representation of machine in the example form of a computer system 2400 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a media player (e.g., portable audio player, vehicle audio player, or any media rendering device), a Personal Digital Assistant (PDA), a cellular telephone, a web appliance, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2400 includes a processor 2412 (e.g., a central processing unit (CPU), a graphics processing unit (GPU), digital signal processor (DSP) or any combination thereof), a main memory 2404 and a static memory 2406, which communicate with each other via a bus 2408. The computer system 2400 may further include a video display unit 2410 (e.g., a liquid crystal display (LCD) or a cathode ray tube (CRT)). The computer system 2400 also includes an alphanumeric input device 2413 (e.g., a keyboard), a user interface (UI) navigation device 2414 (e.g., a mouse), a disk drive unit 2416, a signal generation device 2418 (e.g., a speaker) and a network interface device 2420.

The disk drive unit 2416 includes a machine-readable medium 2422 on which is stored one or more sets of instructions and data structures (e.g., software 2424) embodying or utilized by any one or more of the methodologies or functions described herein. The software 2424 may also reside, completely or at least partially, within the main memory 2404 and/or within the processor 2412 during execution thereof by the computer system 2400, the main memory 2404 and the processor 2412 also constituting machine-readable media.

The software 2424 may further be transmitted or received over a network 2426 via the network interface device 2420 utilizing any one of a number of well-known transfer protocols (e.g., FTP).

While the machine-readable medium 2422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Figure 25:
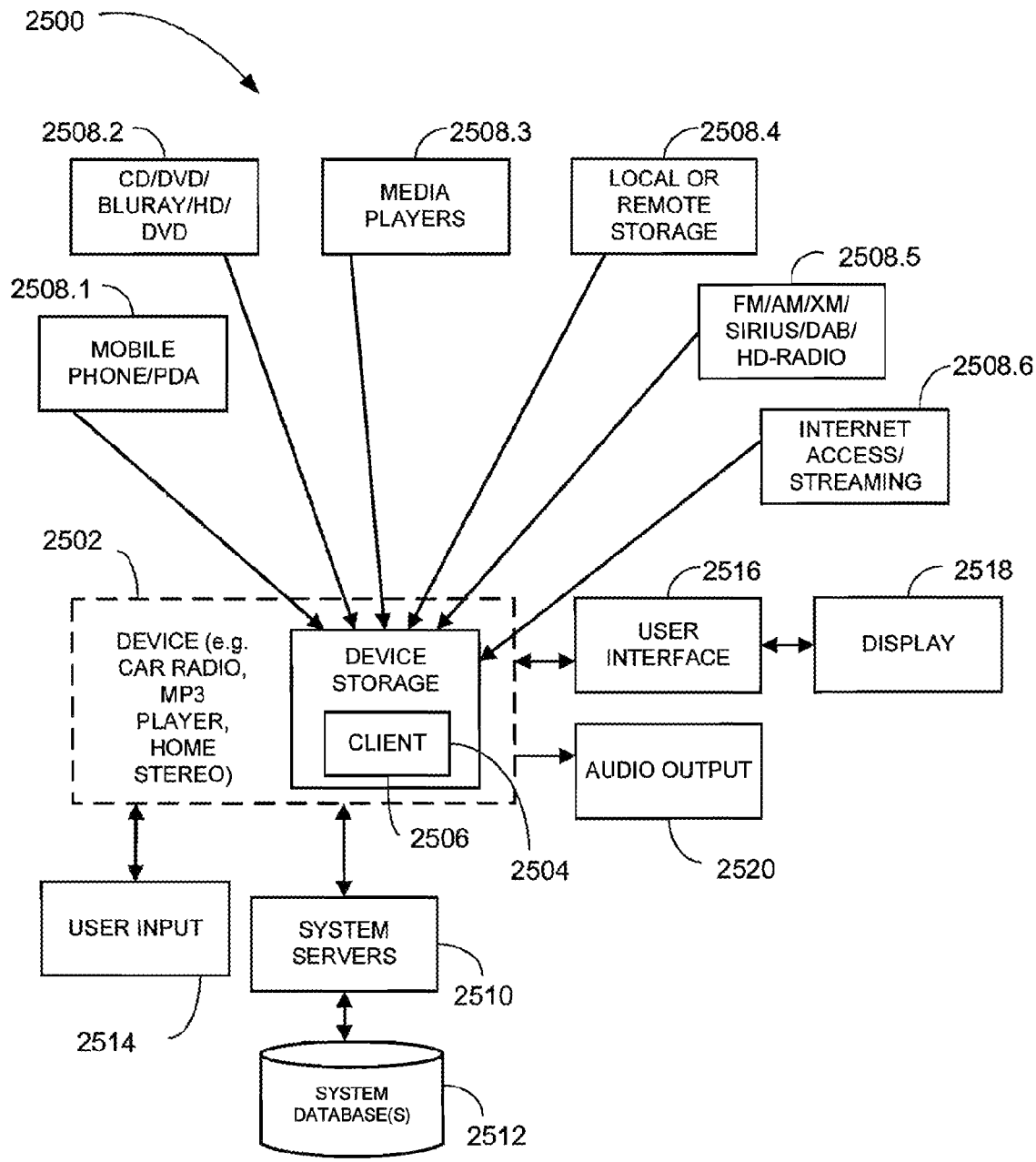
FIG. 25 illustrates a block diagram of an example end-user system in which the client of FIGS. 1A & 1B may be deployed.

FIG. 25 illustrates an example end-use system in which the client 102, 132 may be deployed. The end-use system 2500 may include a device processor 2502 in which a client 2504 may be deployed on device storage 2506. The device may include a car radio, an MP3 player, a home stereo, a computing system, ant the like. The client 2504 may include the functionality of the client 102 and/or the client 135 (see FIGS. 1A and 1B). The device storage 2506 may be a fixed disk drive, flash memory, and the like.

The device processor 2502 may receive content from a plurality of sources 2508.1-2508.6. The plurality of sources as illustrated include a mobile phone/PDA 2508.1, a CD/DVD/BLURAY/HD/DVD 2508, a media player 2058.3, local and/or remote storage 2508.4, a radio station 2508.5, internet access/streaming content 2508.6. However other sources of content may also be used.

The content may be made navigable by an end-user through user of a user interface 2516 coupled to a display 2518, an audio output 2520, and a user input 2514 (e.g., for voice and/or text). The information obtain by the device processor 2502 may be stored locally on the device storage 2506 and/or remotely on a system database 2512 by use of a system server 2512.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of facilitating navigation of a media library including a plurality of media objects, the method comprising:
 accessing a local database provided on a client device, the local database comprising an entity hierarchy of a plurality of semantic entities and a plurality of media descriptors, wherein one or more of the plurality of semantic entities is associated with one or more media descriptors;
 processing the plurality of media objects using at least one processor of a machine to identify one or more of the media descriptors associated with each media object;
 identifying an entity in the entity hierarchy corresponding to the one or more media descriptors associated with the media object;
 applying inheritance to the plurality of semantic entities so that at least some of the plurality of semantic entities not having directly associated media descriptors are associated with media descriptors associated with one or more other entity; and
 storing the association between the media objects and the one or more media descriptors associated with the media objects through the applied inheritance to allow a user to subsequently navigate using the media descriptors to select a media object or a group of media objects on the client device.

2. The method of claim 1, wherein applying inheritance to the plurality of semantic entities further comprises:
 when a child entity in the entity hierarchy does not have the directly associated media descriptor,
 applying cascading down inheritance to the plurality of semantic entities wherein the child entity inherits a media descriptor associated with a parent entity.

3. The method of claim 1, wherein applying inheritance to the plurality of semantic entities further comprises:
 when a parent entity in the entity hierarchy does not have the directly associated media descriptor,
 applying cascading up inheritance to the plurality of semantic entities wherein the parent entity inherits a media descriptor associated with a child entity.

4. The method of claim 1, further comprising associating a flag with a media object, the flag identifying media object is to receive special handling during navigation.

5. The method of claim 1, wherein applying inheritance to the plurality of semantic entities further comprises:
 creating a mapping between at least two entities of the plurality of semantic entities of the same entity type to provide for an additional association between the at least two entities; and
 wherein storing the association between the media objects and the plurality of semantic entities further comprises storing the mapping between the at least two entities.

6. A method of creating an information architecture for media objects for facilitating navigation of a media library including the media objects, the method comprising:
 creating, using a processor of a machine, a semantic descriptor hierarchy from at least one descriptor system, the at least one descriptor system including a plurality of semantic descriptors and a master descriptor code list, the master descriptor code list including a plurality of master descriptor codes associated with the media objects;
 creating a descriptor relation table, the descriptor relation table relating at least some of the master descriptor codes with other master descriptor codes in the master descriptor code list in accordance with a weighting; and
 deploying the semantic descriptor hierarchy and the descriptor relation table in a client as the information architecture to allow a user to subsequently navigate the media library to select a media object or a group of media objects on the client, wherein a semantic descriptor not having an associated master descriptor code inherits a master descriptor code from another semantic descriptor in the semantic descriptor hierarchy.

7. The method of claim 6, wherein creating the semantic descriptor hierarchy from the at least one descriptor system comprises:
 selecting a plurality of category lists from a plurality of available category lists of the at least one descriptor system, the category lists providing the plurality of semantic descriptors; and
 using the selected category lists as the semantic descriptor hierarchy.

8. The method of claim 7, wherein creating the semantic descriptor hierarchy from the at least one descriptor system further comprises:
 creating category list ordering data, the category list ordering data enabling at least one alternate ordering of the selected category lists.

9. The method of claim 6, wherein creating the semantic descriptor hierarchy from the at least one descriptor system further comprises:
 creating a third party mapping table, the third party mapping table associating a plurality of descriptor terms used by a third party to the plurality of master descriptor codes.

10. The method of claim 6, wherein creating the semantic descriptor hierarchy from at the least one descriptor system comprises:
 creating a plurality of semantic descriptor hierarchies from at least one descriptor system; and
 linking the plurality of semantic descriptor hierarchies.

11. The method of claim 6, wherein creating the semantic descriptor hierarchy from the at least one descriptor system comprises:
 selecting a plurality of category lists from a plurality of available category lists of the at least one descriptor system, the category lists providing the plurality of semantic descriptors;
 selecting at least one of upward mapping or downward mapping with the selected category lists; and
 using the selected category lists and the at least one mapping as the semantic descriptor hierarchy.

12. The method of claim 6, wherein creating the descriptor relation table further comprises:
 creating a plurality of semantic entity hierarchies.

13. The method of claim 6, wherein the at least one descriptor system includes at least one of an original descriptor system or a translated version of the original descriptor system with labels in a different language.

14. The method of claim 6, wherein the client is a media player device.

15. The method of claim 1, wherein the entities comprise a media channel, a media stream, a station, a program, a slot, a playlist, a web page, a recording artist, a composer, a composition, a movement, a performance, a recording, a recording mix track, a track segment, a track, a release, an edition, an album, an album series, a graphic image, a photograph, a video segment, a video, a video still image, a TV episode, a TV series, a film, a podcast, an event, a location, and/or a venue.

16. The method of claim 1, wherein the media descriptors comprise at least one of identification codes and a textual label.

17. The method of claim 16, wherein the media descriptors are at least one of genre ID codes, origin ID codes, recording era ID codes, composition era ID codes, artist type ID codes, tempo ID codes, mood ID codes, situation ID codes, work type ID codes, topic ID codes, personal historical contextual ID codes, community historical contextual ID code, and/or timbre ID codes.

18. The method of claim 1, wherein processing a plurality of media objects using at least one processor comprises:
   extracting a digital fingerprint from a media object to obtain an identifier; and
   associating the one or more of the media descriptors with the media object using the identifier.

19. Apparatus comprising:
   memory to store instructions; and
   at least one processor to execute the instructions to perform operations comprising:
      accessing a local database provided on a client device, the local database comprising an entity hierarchy of a plurality of semantic entities and a plurality of media descriptors, wherein one or more of the plurality of semantic entities is associated with one or more media descriptors;
      processing a plurality of media objects to identify one or more of the media descriptors associated with each media object;
      identifying an entity in the entity hierarchy corresponding to the one or more media descriptors associated with the media object;
      applying inheritance to the plurality of semantic entities so that at least some of the plurality of semantic entities not having directly associated media descriptors are associated with media descriptors associated with one or more other entities; and
      storing the association between the media objects and the one or more media descriptors associated with the media objects through the applied inheritance to allow a user to subsequently navigate a media library using the media descriptors to select a media object or a group of media objects on the apparatus.

20. Apparatus comprising:
   memory to store instructions; and
   at least one processor to execute the instructions to perform operations to create an information architecture for media objects in a media library, the operations comprising:
      creating, using a processor of a machine, a semantic descriptor hierarchy from at least one descriptor system, the at least one descriptor system including a plurality of semantic descriptors and a master descriptor code list, the master descriptor code list including a plurality of master descriptor codes associated with the media objects;
      creating a descriptor relation table, the descriptor relation table relating at least some of the master descriptor codes with other master descriptor codes in the master descriptor code list in accordance with a weighting; and
      deploying the semantic descriptor hierarchy and the descriptor relation table in a client as the information architecture to allow a user to subsequently navigate the media library to select a media object or a group of media objects on the apparatus, wherein a semantic descriptor not having an associated master descriptor code inherits a master descriptor code from another semantic descriptor in the semantic descriptor hierarchy.

21. The method of claim 1, wherein one or more entities have associated information for display in a user interface element for display on a display device to allow the user to subsequently navigate the media library.

22. The method of claim 2, wherein the parent entity is associated with a recording artist and has an associated genre media descriptor and the child entity is associated with an album by the recording artist but does not have a directly associated genre media descriptor, the method comprising the child entity inheriting the genre media descriptor of the parent entity.

23. The method of claim 2, wherein the parent entity is associated with an album and has an associated genre media descriptor and the child entity is associated with a recording on the album but does not have a directly associated genre media descriptor, the method comprising the child entity inheriting the genre media descriptor of the parent entity.

24. The method of claim 3, wherein the child entity is associated with an album and has an associated genre media descriptor and the parent entity is associated with a recording artist of the album but does not have a directly associated genre media descriptor, the method comprising the parent entity inheriting the genre media descriptor of the child entity.

25. The method of claim 3, wherein the child entity is associated with a recording and has an associated genre media descriptor and the parent entity is associated with an album but does not have a directly associated genre media descriptor, the method comprising the parent entity inheriting the genre media descriptor of the child entity.

26. The method of claim 4, wherein the flag is used as a display filter option.

27. The method of claim 4, wherein the flag is used to handle duplicate items, the flag identifying duplicates based at least on a fingerprint, duplicates based on a Table Of Contents (TOC), duplicates based on a filename, duplicates based on a track name, and/or duplicates based on file hash.

28. The method of claim 4, wherein the flag indicates that an entity is a various artist compilation, a soundtrack, a holiday related theme, an interview, and/or a bootleg recording.

* * * * *

UNITED STATES PATENT AND TRADEMARK OFFICE
CERTIFICATE OF CORRECTION

PATENT NO. : 7,908,273 B2
APPLICATION NO. : 11/716269
DATED : March 15, 2011
INVENTOR(S) : Peter C. DiMaria et al.

It is certified that error appears in the above-identified patent and that said Letters Patent is hereby corrected as shown below:

On the Title Page: Item (56) References Cited

On page 3, under "Other Publications", in column 1, line 10, delete "techdiaest" and insert -- techdigest --, therefor.

On page 3, under "Other Publications", in column 2, line 35, delete "Allamanche, E ," and insert -- Allamanche, E, et al., --, therefor.

On page 3, under "Other Publications", in column 2, line 55, delete "Interworking" and insert -- Internetworking --, therefor.

On page 4, under "Other Publications", in column 1, line 2, before "Seventh" delete "the".

On page 4, under "Other Publications", in column 1, line 29, delete "Osbourne" and insert -- Osborne --, therefor.

On page 4, under "Other Publications", in column 1, line 43, delete "Implementors" and insert -- Implementers --, therefor.

In the Drawings:

On Sheet 21 of 26, Reference Numeral 2004, Figure 20, line 2, delete "NORMALIZIED" and insert -- NORMALIZED --, therefor.

In the Specifications:

In column 1, line 9, delete "Filed" and insert -- filed --, therefor.

In column 5, line 52, delete "genres)." and insert -- genres. --, therefor.

Signed and Sealed this
Thirty-first Day of May, 2011

David J. Kappos
*Director of the United States Patent and Trademark Office*

CERTIFICATE OF CORRECTION (continued)
U.S. Pat. No. 7,908,273 B2

In column 8, line 17, below "like." insert -- The client application 166 may provide navigational access to media objects 138.1, 138.2 through a user interface 168. The user interface 168 may provide navigational information and other information to an end-user through a display device (e.g., on a device) or an application. --.

In column 8, lines 22-26, below "168." delete "One or more navigation templates 184 may be accessed by the navigation service 176. The navigation templates 184 may enable differing navigational views into one or more descriptor hierarchies 152 available to the client 102 through the user interface 138.".

In column 10, line 2, delete "106.1 -106.n" and insert -- 106.1-106.n --, therefor.

In column 10, line 9, below "314." insert -- The template ID 302 may be an identifier (e.g., a unique identifier) that may be use to select the navigation template 300 (e.g., among the one or more navigation templates 114) for navigational use. --.

In column 10, lines 20-29, below "314." insert -- The region 304 may define the regional viewpoint that is used to select the appropriate descriptor systems and other navigational elements such that they can be assembled into a user interface that conforms to the cultural expectations of a specific regional user base. For example, the selection of the region may include the United States, Germany, Brazil, Japan, Korea, the Middle East, China, global, Eurasia, America, and/or Asia, U.S. East Coast, New England States, Chicago, and the like. Other regions may also be available for selection --.

In column 12, line 41, delete "recoding" and insert -- recording --, therefor.

In column 13, line 28, below "(see FIG. 5)." insert -- A descriptor system 104 (see Figure 1) may be accessed at block 702. The descriptor system 104 may include a plurality of available category lists 132. An example embodiment of creating a descriptor system 104 that may be accessed during the operations at block 702 is described in greater detail below. --.

In column 13, line 37, delete "selected.122." and insert -- selected 122. --, therefor.

In column 13, lines 38-46, below "122." delete "A descriptor hierarchy 116 (see FIG. 1) may be created at block 704. The descriptor hierarchy 116 may be created by selecting from a plurality of available category lists 132 of a corresponding descriptor type and mappings from the upward mapping 128 and/or downward mapping 130 associated with the selected category lists 232. The descriptor system 114 thereby may act as having a superset of available category lists 132 from which the selected category lists 232 of the descriptor hierarchy 116 are selected. 122.".

In column 22, line 64, after "store)" insert -- . --.

CERTIFICATE OF CORRECTION (continued)
U.S. Pat. No. 7,908,273 B2

In The Claims:

In column 31, line 32, in Claim 1, after "navigate" insert -- the media library --.

In column 32, line 39, in Claim 10, delete "from at the least" and insert -- from the at least --, therefor.